(12) United States Patent
Kawakami et al.

(10) Patent No.: US 10,511,735 B2
(45) Date of Patent: Dec. 17, 2019

(54) IMAGE FORMING APPARATUS

(71) Applicant: KONICA MINOLTA, INC., Chiyoda-ku, Tokyo (JP)

(72) Inventors: Yoshiteru Kawakami, Kokubunji (JP); Yasuo Shiokawa, Hino (JP); Takahiro Okubo, Yokohama (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/032,802

(22) Filed: Jul. 11, 2018

(65) Prior Publication Data

US 2019/0020777 A1    Jan. 17, 2019

(30) Foreign Application Priority Data

Jul. 13, 2017   (JP) .................................. 2017-136753
Aug. 22, 2017  (JP) .................................. 2017-158970

(51) Int. Cl.
*H04N 1/00*  (2006.01)
*B41J 3/60*  (2006.01)
*B65H 5/02*  (2006.01)

(52) U.S. Cl.
CPC ............ *H04N 1/00572* (2013.01); *B41J 3/60* (2013.01); *B65H 5/025* (2013.01); *H04N 1/00602* (2013.01)

(58) Field of Classification Search
CPC ... H04N 1/00572; H04N 1/00602; B41J 3/60; B65H 5/025
USPC ........................................................ 358/1.15
See application file for complete search history.

(56) References Cited

U.S. PATENT DOCUMENTS 5,052,670 A * 10/1991 Makiura .............. G03G 15/234
                                                      271/127
2007/0057444 A1 * 3/2007 Sagawa .................. B65H 3/047
                                                      271/225

FOREIGN PATENT DOCUMENTS

JP          11-139646 A    5/1999

* cited by examiner

*Primary Examiner* — Tammy Paige Goddard
*Assistant Examiner* — Darryl V Dottin
(74) *Attorney, Agent, or Firm* — Buchanan Ingersoll & Rooney PC

(57) ABSTRACT

An image forming apparatus includes an image former, a conveyance path, a flipping conveyance path, a conveying mechanism and a hardware processor. The flipping conveyance path includes a side path connecting a first branch point in a downstream of the conveyance path to a junction in an upstream of the conveyance path and a re-feeding path connecting a second branch point in the side path to a re-feeding point in an upstream of the conveyance path. The hardware processor controls the conveying mechanism to perform (i) a conveyance operation to convey the sheet along the conveyance path, (ii) a draw-in operation to draw the sheet with the image into the side path, and (iii) a re-feeding operation to convey the sheet in a reverse direction to re-feed the flipped sheet from the re-feeding point to the conveyance path.

15 Claims, 12 Drawing Sheets

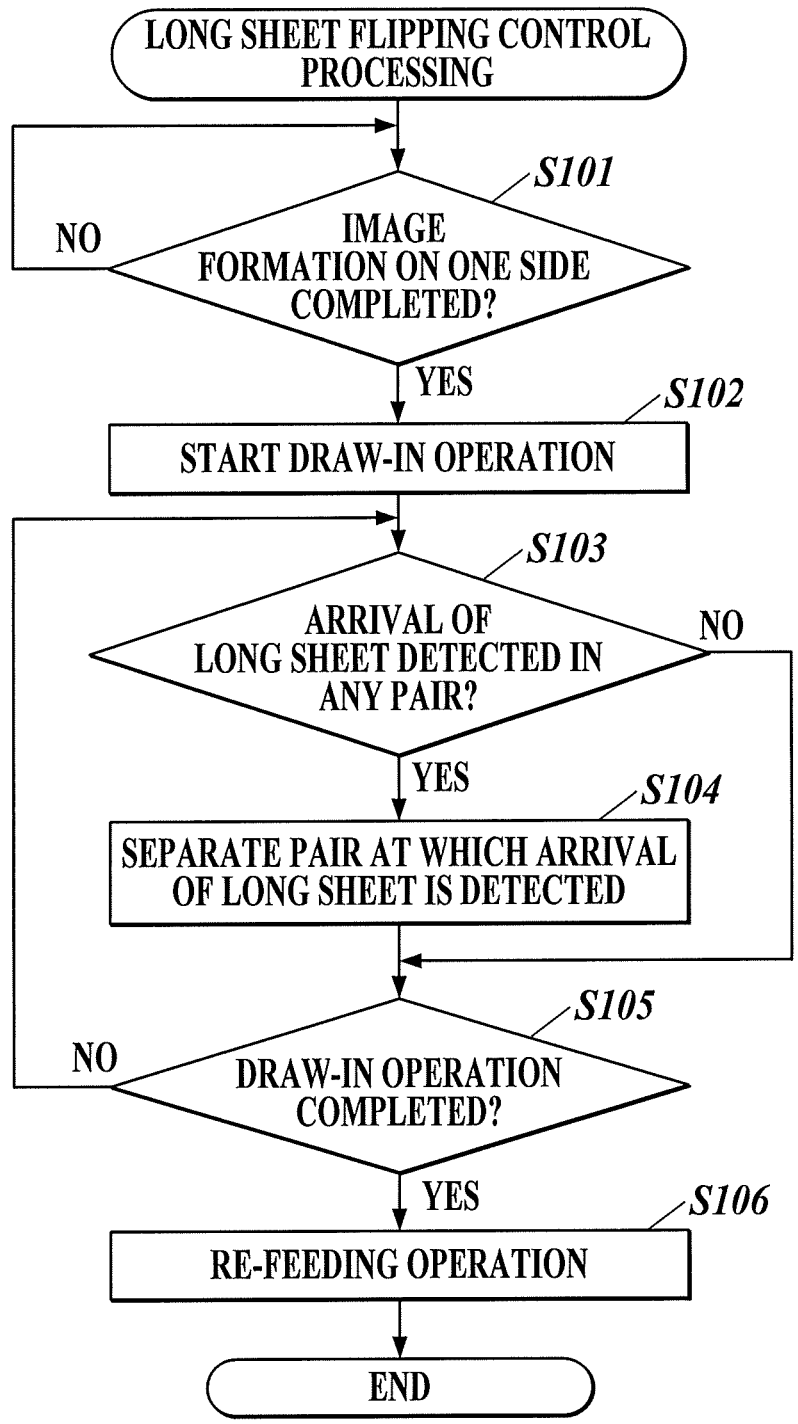

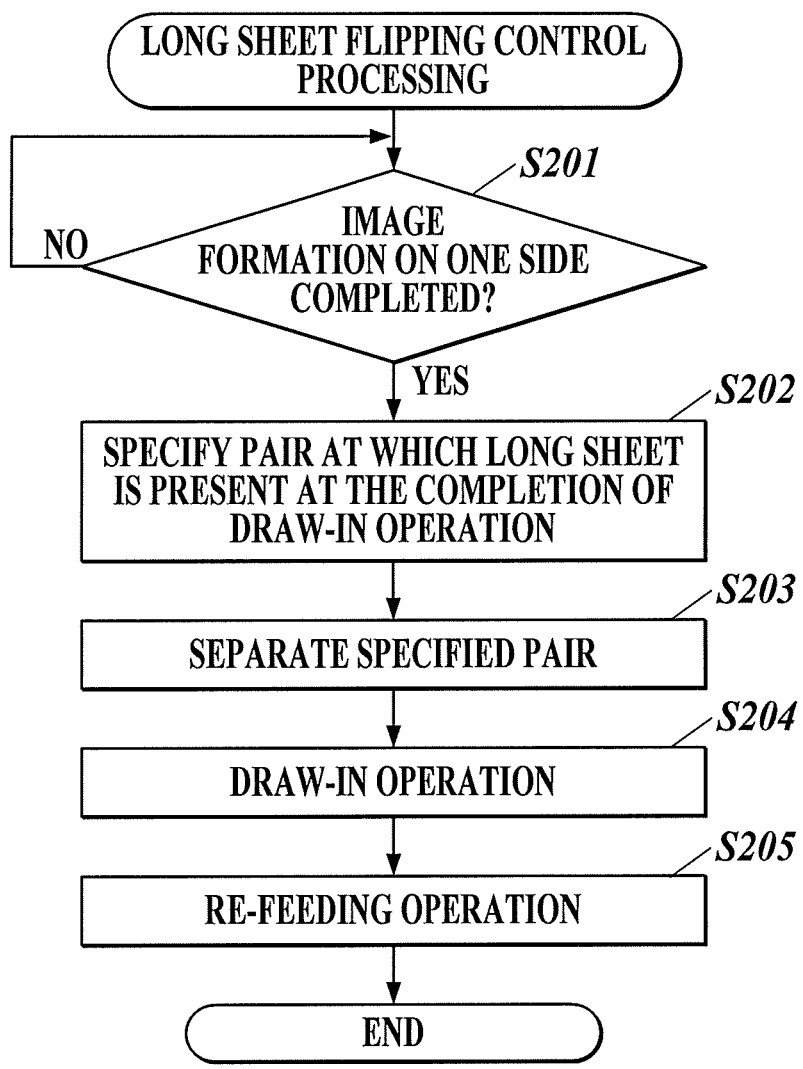

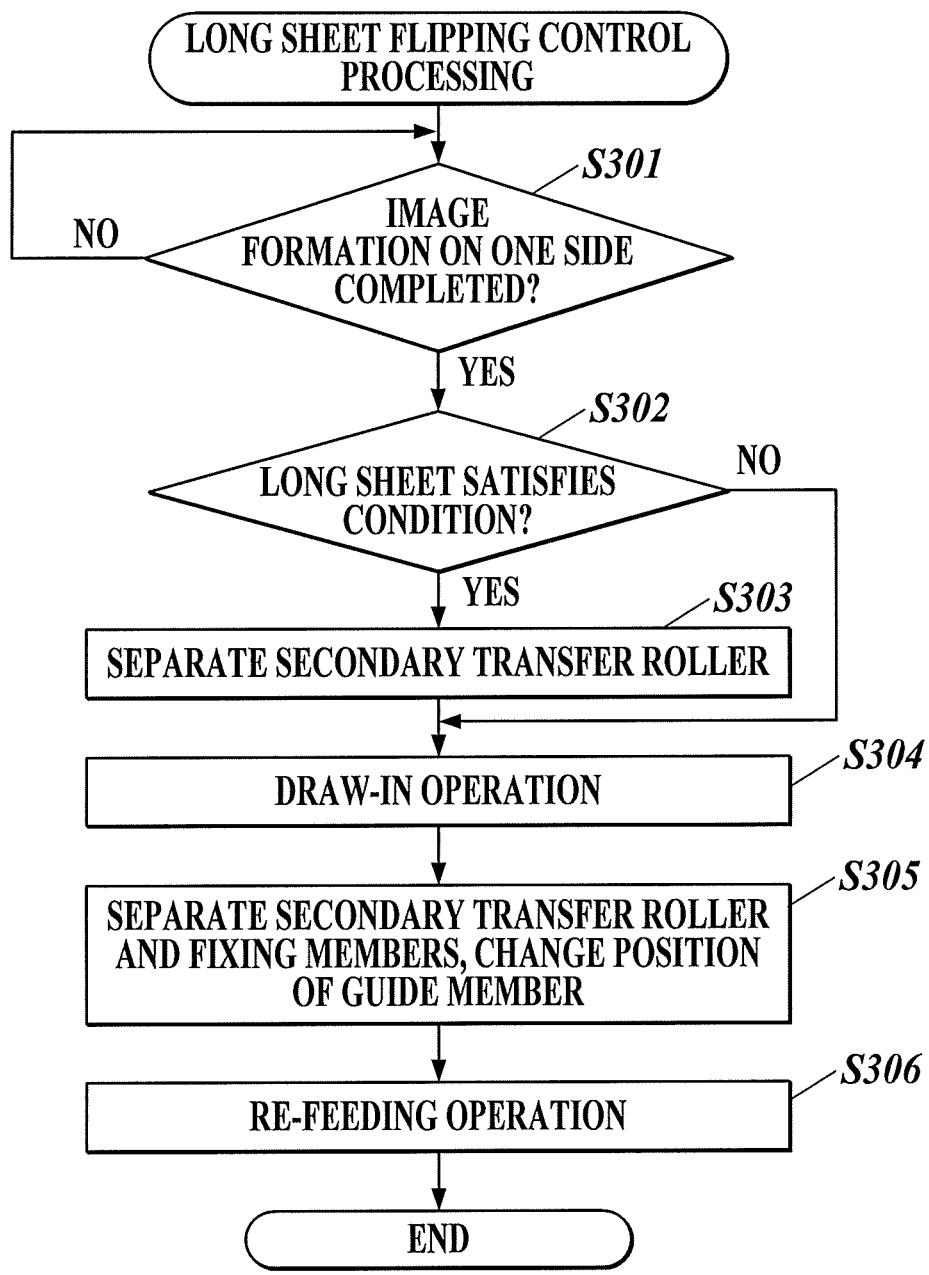

IMAGE FORMING APPARATUS

BACKGROUND

1. Technological Field

The present invention relates to an image forming apparatus.

2. Description of the Related Art

In recent years, multifunctional image forming apparatuses that combine the functions of printer, scanner, copier, fax and the like have been widely used. With regard to such image forming apparatuses, there is an increasing demand for automatic duplex printing on a long sheet (sheet that are long relative to standard-size sheets).

For example, a technique of handling a long sheet in a conveyance path after forming and fixing an image on one side thereof has been proposed, which involves drawing the long sheet into a side path that extends in the height direction of an image forming apparatus to a lower part of the apparatus and then re-feeding it to the conveyance path through a re-feeding path by rotating a flipping roller pair in a reverse direction disposed in the side path (e.g. see JP H11-139646A). With such a long side path to which a long sheet is drawn in, it is possible to flip the long sheet and to perform duplex printing.

However, when a side path occupies a large space in an apparatus, it is difficult to secure the rigidity of a case, which may sometimes result in the deteriorated durability of the apparatus. The same problem occurs in handling large standard-size sheets such as A3 sheets as well as long sheets.

SUMMARY

The present invention has been made in view of the above-described problem, and an object thereof is to provide an image forming apparatus that can perform automatic duplex printing on a sheet without sacrificing the durability of the apparatus, and a program therefor.

To achieve at least one of the abovementioned objects, according to an aspect of the present invention, an image forming apparatus includes:

an image former which forms an image on a sheet;

a conveyance path for conveying the sheet to the image former;

a flipping conveyance path which includes a side path connecting a first branch point in a downstream of the conveyance path with respect to the image former to a junction in an upstream of the conveyance path with respect to the image former and a re-feeding path connecting a second branch point in the side path to a re-feeding point in an upstream of the conveyance path with respect to the image former;

a conveying mechanism which conveys the sheet along the conveyance path and the flipping conveyance path; and a hardware processor which controls the conveying mechanism to perform (i) a conveyance operation to convey the sheet along the conveyance path, (ii) a draw-in operation to draw the sheet with the image on one side into the side path until a rear end of the sheet reaches a section between the second branch point and the junction, and (iii) a re-feeding operation to convey the sheet in a reverse direction to re-feed the flipped sheet from the re-feeding point to the conveyance path through the re-feeding path.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 7 is a flowchart of long sheet flipping control processing that is performed in the first embodiment by the hardware processor in FIG. 6;

FIG. 8 is a flowchart of long sheet flipping control processing that is performed in a second embodiment by the hardware processor in FIG. 6;

FIG. 9 is a flowchart of long sheet flipping control processing that is performed in a third embodiment by the hardware processor in FIG. 6;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Configuration of Image Forming Apparatus 100

First, the configuration of an image forming apparatus 100 according to a first embodiment will be described.

Figure 1:
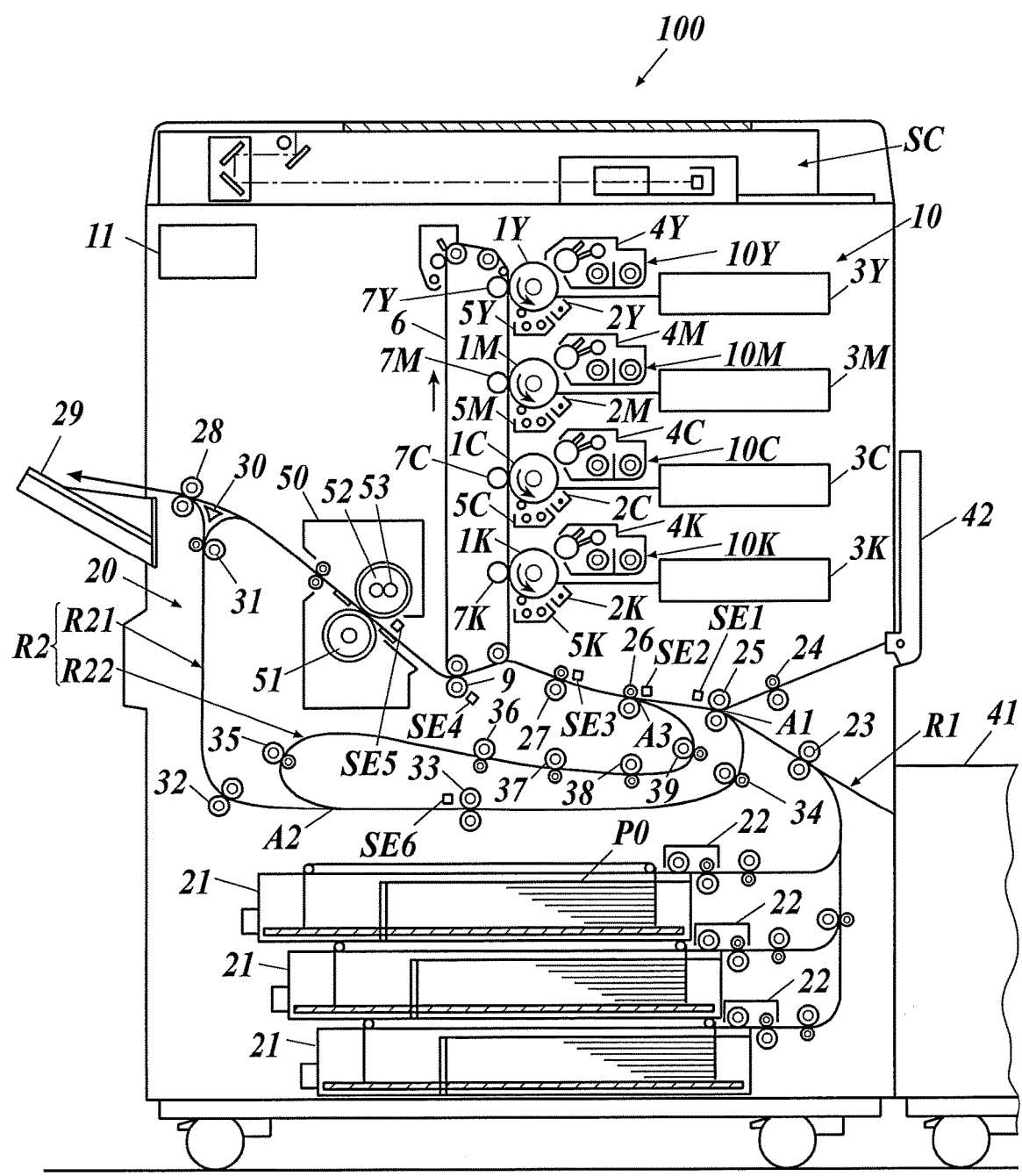
FIG. 1 is a schematic configuration view of an image forming apparatus according to a first embodiment.

FIG. 1 is a schematic configuration view of the image forming apparatus 100 according to the embodiment. For example, the image forming apparatus 100 is an electrophotographic image forming apparatus such as a copier, specifically a so-called tandem color image forming apparatus that forms a full-color image by using vertically arrayed photoreceptors that are opposed to a single intermediate transfer belt. The image forming apparatus 100 can form an image not only on a standard-size sheet P0 having a typical size but also on a long sheet P1 that is longer than the standard-size sheet P0. The standard-size sheet P0 is stored in a feeding tray 21 or the like while the long sheet P1 is fed into the apparatus from an external long sheet tray 41 connected to the image forming apparatus 100 or a manual feeding tray 42, which will be described later. In the following, image formation on the long sheet P1 is mainly described. However, an image can be formed similarly on the standard-size sheet P0, too. Further, the present invention is also applicable to small image forming apparatuses which are so small that the rear end of the standard-size sheet P0 reaches a junction A1 (described later) in a flipping operation.

The image forming apparatus 100 mainly includes a scanner SC, an image former 10, a fixer 50 and a hardware processor 11, which are housed in a single case.

The scanner SC irradiates an image of an original with a scanning optical system and reads the reflection light with a line image sensor so as to obtain an image signal. The image signal is subjected to A/D conversion, shedding correction, compression and the like and then input to the hardware processor 11 as image data. The image data to be input to the hardware processor 11 is not limited to data read by the scanner SC and may be data received from a personal computer or another image forming apparatus connected to the image forming apparatus 100 through a communicator 13.

The image former 10 includes four image forming units 10Y, 10M, 10, 10K, an intermediate transfer belt 6, a secondary transfer roller 9 and the like. The image forming units 10Y, 10M, 10C, 10K are constituted by an image forming unit 10Y for forming a yellow (Y) image, an image forming unit 10M for forming a magenta (M) image, an image forming unit 10 C for forming a cyan (C) image and an image forming unit 10K for forming a black (K) image.

The image forming unit 10Y includes a photoreceptor drum 1Y, and a charger 2Y, an optical writer 3Y, a developer 4Y and a drum cleaner 5Y that are disposed around the photoreceptor drum 1Y. Similarly, the image forming units 10M, 10C, 10K include respectively photoreceptor drums 1M, 1C, 1K, chargers 2M, 2C, 2K, optical writers 3M, 3C, 3K, developers 4M, 4C, 4K and drum cleaners 5M, 5C, 5K that are disposed around the respective photoreceptor drums 1M, 1C, 1K.

The chargers 2Y to 2K uniformly charge the surfaces of the photoreceptor drums 1Y to 1K. The optical writers 3Y to 3K scan to expose the surfaces so as to form latent images on the photoreceptor drums 1Y to 1K. The developers 4Y to 4K develop the latent images on the photoreceptor drums 1Y to 1K with toner so as to form visible images. Toner images of the predetermined respective colors of yellow, magenta, cyan and black are thus formed on the photoreceptor drums 1Y to 1K. The toner images formed on the photoreceptor drums 1Y to 1K are sequentially transferred to a predetermined position on a rotating intermediate transfer belt 6 by primary transfer rollers 7Y, 7M, 7C and 7K.

The toner images thus transferred to the intermediate transfer belt 6 are further transferred to the long sheet P1 by secondary transfer roller 9 when the long sheet P1 is conveyed at a predetermined timing by the sheet conveyer (conveying mechanism) 20 (described later). The secondary transfer roller 9 is a pressure-contact member that is disposed to be in pressure contact with the intermediate transfer belt 6 so as to form a nipping portion (hereinafter referred to as a "transfer nip"). The state of the secondary transfer belt 9 is switchable between a pressure-contact state and a separated state by a control of the hardware processor 11. That is, the intermediate transfer belt 6 and the secondary transfer roller 9 constitute a pair of transferring members in the embodiment.

Figure 2A:
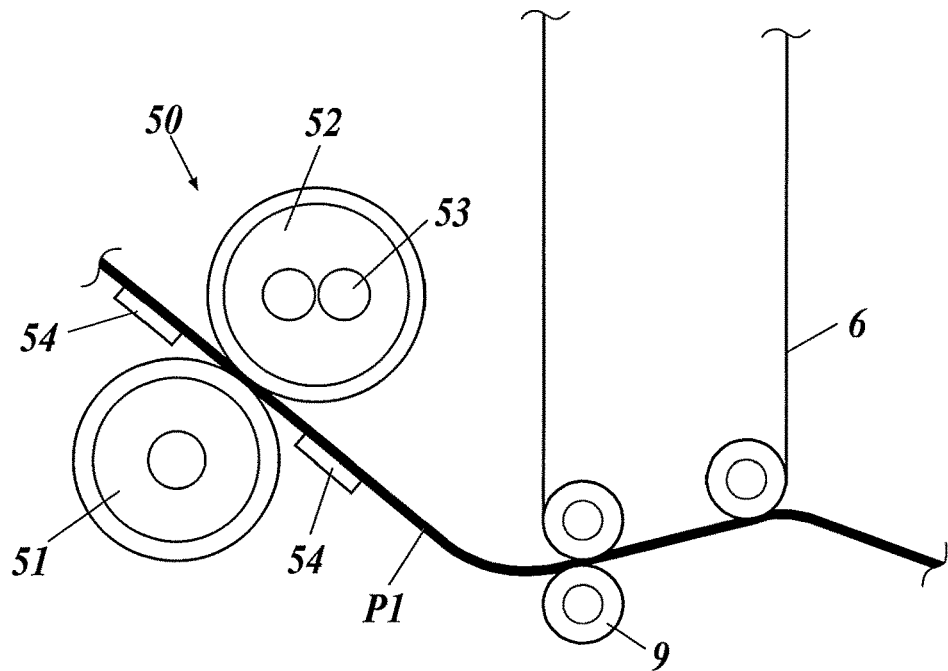
FIG. 2A illustrates an operation of the components of a fixer.
Figure 2B:
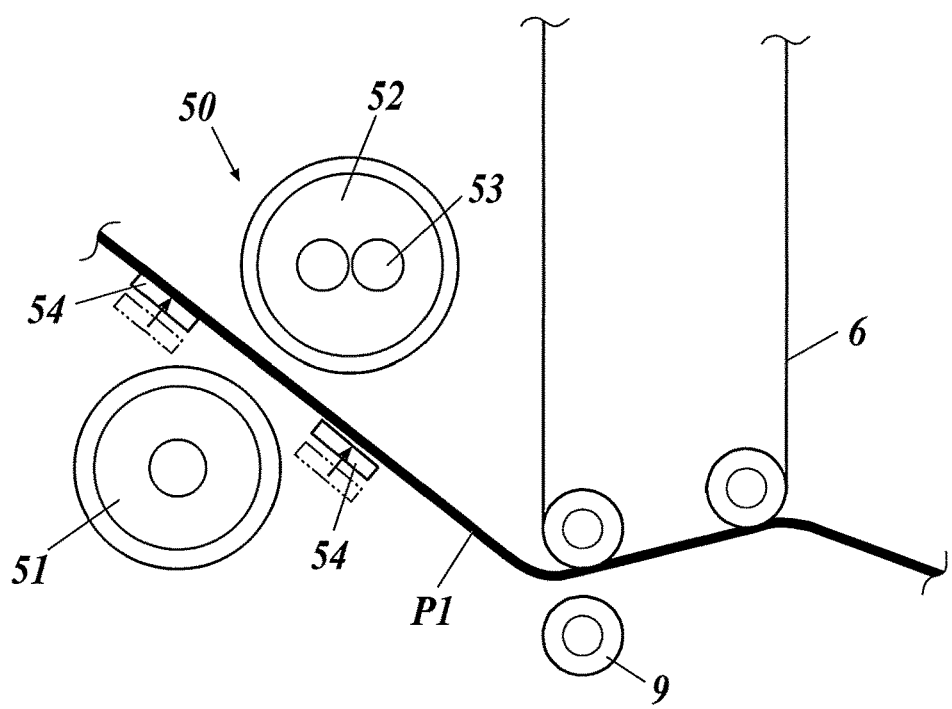
FIG. 2B illustrates an operation of the components of the fixer.

Next, the fixer 50 will be described referring to FIG. 1, FIG. 2A and FIG. 2B. FIG. 2A and FIG. 2B are schematic views illustrating an operation of the components of the fixer 50.

The fixer 50 is provided to perform fixation on the long sheet P1 with toner images transferred thereon, i.e. the long sheet P1 sent from the transfer nip. For example, the fixer 50 includes a pair of fixing members 51, 52, a heater 53 for heating either or both fixing members 51, 52 and a guide member 54. The fixer 50 fixes the toner images onto the long sheet P1 by the pressure of the pair of fixing members 51, 52 and the heat of the pair of fixing members 51, 52 in the middle of conveyance of the long sheet P1. The fixing members 51, 52 are pressure-contact members that are disposed to be in pressure contact with each other so as to form a nipping portion (hereinafter referred to as a "fixation nip"). The state of the fixing members 51, 52 are switchable between a pressure-contact state and a separated state by a control of the hardware processor 11.

Instead of a pair of rollers, the fixing member 51, 52 may also be constituted by or a pair of rotating members selected from a variety of combinations, e.g. a pair of belts, a belt and a roller, and the like.

As illustrated in FIG. 2A, the guide member 54 supports the long sheet P1 to guide entry of the long sheet P1 into the fixation nip. Further, the guide member 54 is movable by a control of the hardware processor 11. When the fixing members 51, 52 are switched to the separated state, it is moved in the arrow direction as illustrated in FIG. 2B. The guide member 54 is moved to a position for supporting the long sheet P1 so that it can prevent the long sheet P1 from contacting the fixing members 51, 52 while the fixing members 51, 52 are separated from each other.

After fixation by the fixer 50, the long sheet P1 is ejected by an ejection roller 28 to a catch tray 29 that is attached on an outer side face of the case.

As illustrated in FIG. 1, the sheet conveyer 20 conveys the long sheet P1 or the standard-size sheet P0 along a conveyance path R1 and a flipping conveyance path R2 composed of a side path R21 and a re-feeding path R22. The conveyance path R1 connects the long sheet tray 41 or the manual feeding tray 42, or the sheet feeding tray 21 to the sheet catch tray 29 via the transfer nip and the fixation nip of the image former 10. The long sheet P1 is stored in the long sheet tray 41 connected to the image forming apparatus 100 or placed on the manual feeding tray 42. The long sheet P1 is loaded on the conveyance path R1 when it is fed from the long sheet tray 41 or the manual feeding tray 42 into the image forming apparatus 100. The standard-size sheet P0 is stored in the sheet feeding tray 21 The standard-size sheet P0 is loaded on the sheet conveyance path R1 when it is taken in by the sheet feeder 22.

In the conveyance path R1, conveyance roller pairs 23 to 27 for conveying the long sheet P1 are provided in the upstream with respect to the transfer nip. Each of the conveyance roller pairs 23 to 27 is constituted by a pair of rollers that are in pressure contact with each other. When conveying the long sheet P1, at least one roller of the pair is rotary driven in a forward direction by a driving mechanism mainly composed of an electric motor. As used herein, the forward direction refers to a direction in which the long sheet P1 is conveyed to the downstream, and a reverse direction refers to the direction opposite the forward direction. The state of the pairs of rollers of the conveyance roller pairs 23 to 27 is switchable between a pressure-contact state and a separated state by a control of the hardware processor 11.

Instead of a pair of rollers, the conveying means may also be constituted by a pair of rotating members selected from a wide variety of combinations, e.g. a pair of belts, a belt and a roller, and the like.

The conveyance roller pair 26 serves as a loop roller pair, and the conveyance roller pair 27 serves as a resist roller pair. That is, when the long sheet P1 is fed to the conveyance path R1, it is conveyed sequentially by the conveyance roller pairs 23 to 26 that are disposed from the upstream to the downstream. When a front end of the long sheet P1 approaches the conveyance roller pair 27, the long sheet P1 abuts the conveyance roller pair 27 in a rotation halt state by being conveyed by the conveyance roller pair 26 and the like. The conveyance roller pair 26 then continues rotating for a predetermined time so that the long sheet P1 forms a loop. The loop thus formed corrects a curl of the front end of the long sheet P1. Then, the conveyance roller pair 27 starts to rotate at a predetermined timing in synchronization with the toner image on the intermediate transfer belt 6 so as to convey the long sheet P1 to the transfer nip.

In the conveyance path R1 and the flipping conveyance path R2, a detector SE is provided. The detector SE includes position sensors SE1 to SE6. Based on detection results of the position sensors SE1 to SE6, the hardware processor 11 controls the operation of the sheet conveyer 20.

The position sensors SE1 to SE5 are disposed in the conveyance path R1 respectively in the vicinities of the conveyance roller pairs 25 to 27, the secondary transfer roller 9 and the fixing members 51, 52 so as to detect arrival of the front end of the long sheet P1 at respective detection positions of the position sensors SE1 to SE5 (the vicinities of the conveyance roller pairs 25 to 27, the secondary transfer roller 9 and the fixing members 51, 52). The detection results of the position sensors SE1 to SE5 are used for determining the timing of separating the conveyance roller pairs 25 to 27, the secondary transfer roller 9 and the fixing members 51, 52.

The position sensor SE6 is disposed in the flipping conveyance path R2 (side path R21) in the vicinity of the conveyance roller pair 33 so as to detect arrival of a rear end of the long sheet P1 at a detection position of the position sensor SE6 (the vicinity of the conveyance roller pair 33). The detection result of the position sensor SE6 is used for determining the timing of separating the conveyance roller pair 25.

Figure 3:
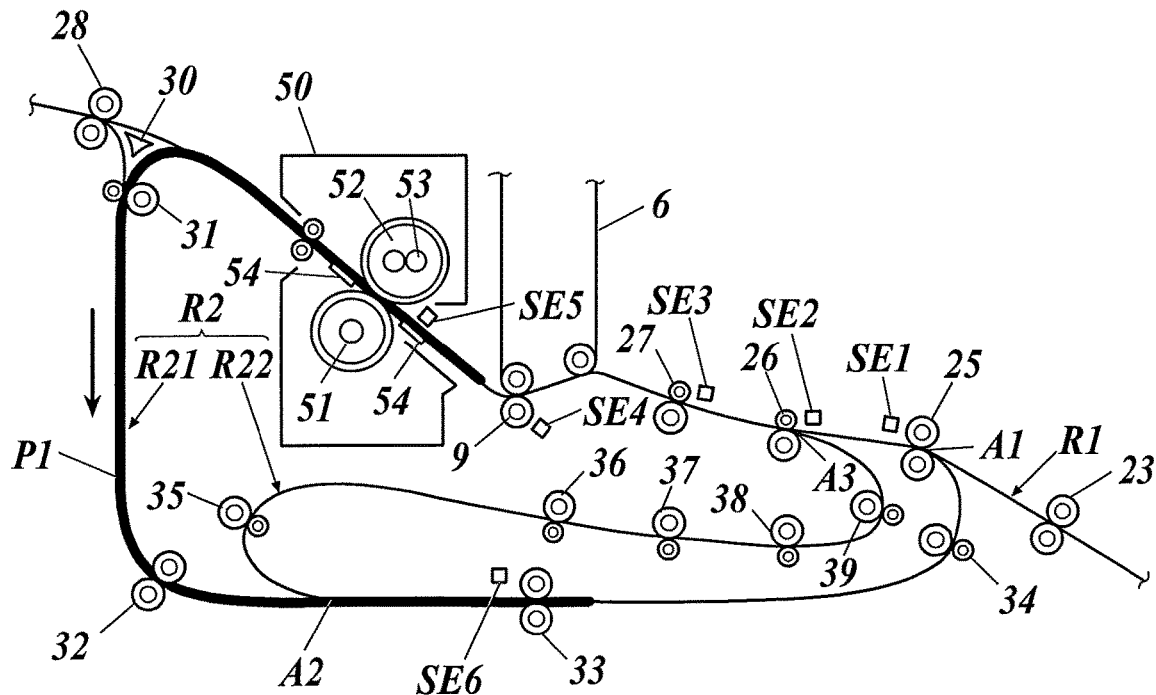
FIG. 3 is a schematic view illustrating the position of a long sheet in the process of a draw-in operation.
Figure 4:
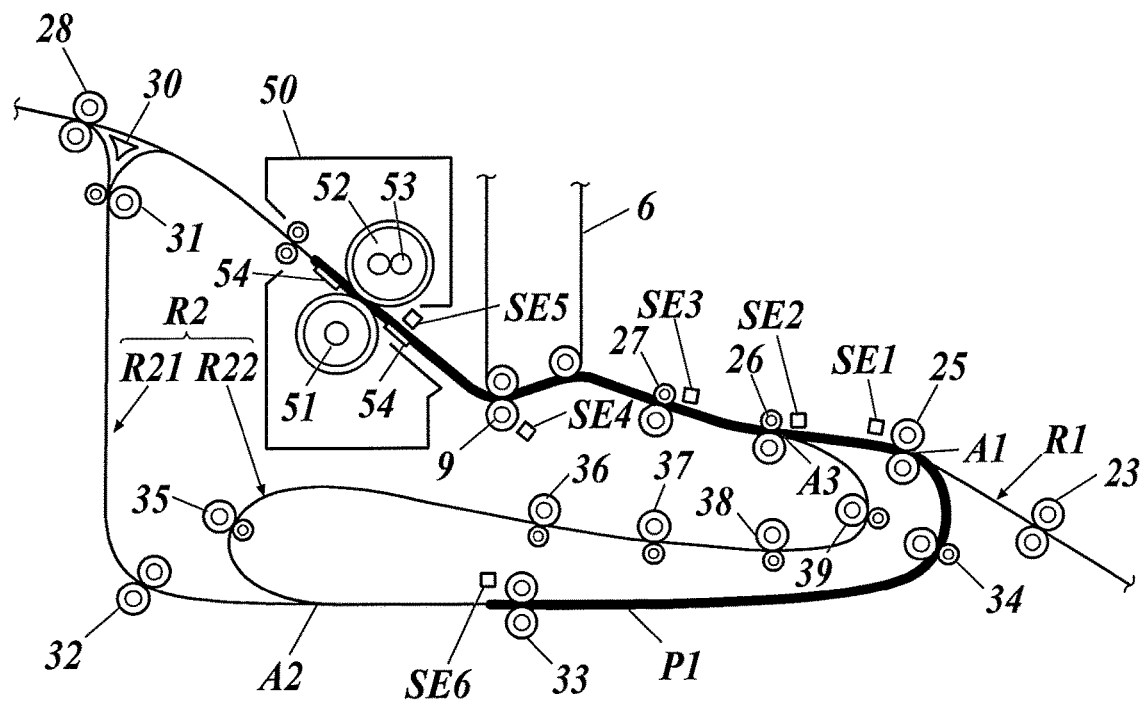
FIG. 4 is a schematic view illustrating the position of a long sheet at the completion of the draw-in operation.
Figure 5:
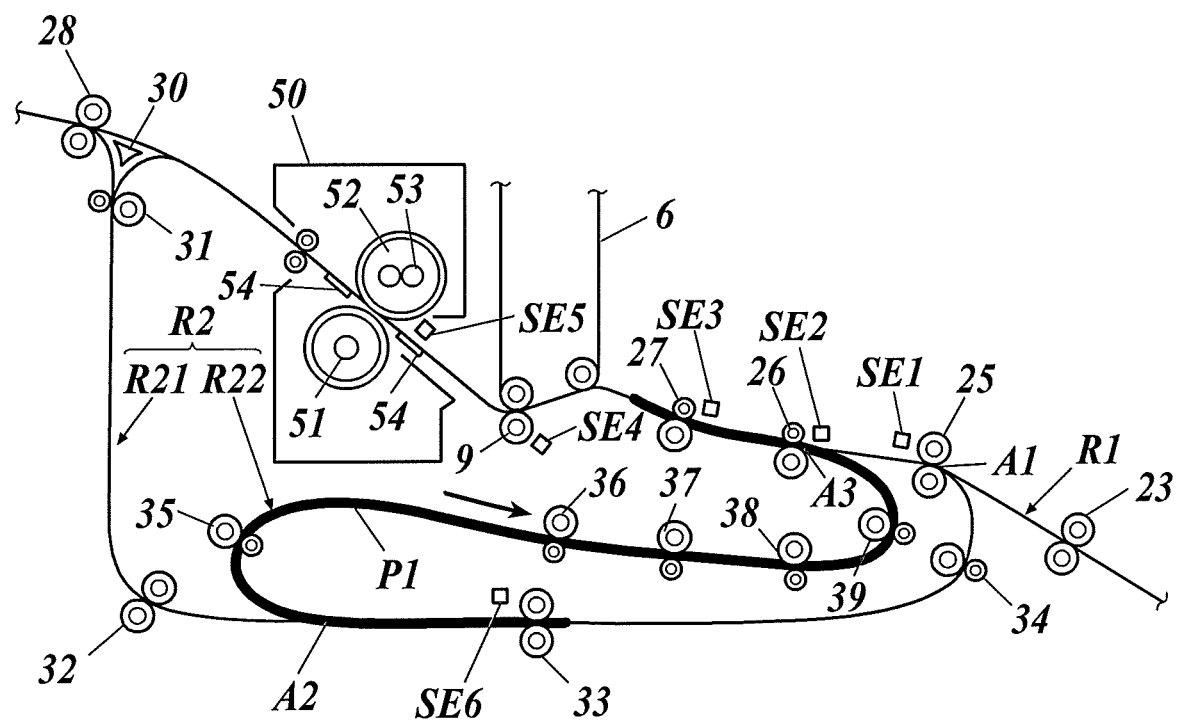
FIG. 5 is a schematic view illustrating the position of a long sheet in the process of a re-feeding operation.

The movement of the long sheet P1 in duplex printing on the long sheet P1 will be described referring to FIG. 3 to FIG. 5. FIG. 3 illustrates the state when the long sheet P1 is being drawn into the side path R21 after image formation on one side, FIG. 4 illustrates the state when the long sheet P1 is completely drawn in, and FIG. 5 illustrates the state in which the flipped long sheet P1 is being fed to the conveyance path R1 again. In FIG. 3 to FIG. 5, the position of the long sheet P1 is illustrated by the bold line along the conveyance path R1 or the flipping conveyance path R2.

When an image is also formed on the back side of the long sheet P1, the long sheet P1 is conveyed into the side path R21 by a switching gate (first branch point) 30 as illustrated in FIG. 3 after image formation on the front side. The side path R21 connects the switching gate 30 disposed in the downstream of the conveyance path R1 with respect to the fixer 50 to a junction A1 disposed in the upstream of the conveyance path R1 with respect to the secondary transfer roller 9. From the side path R21, a re-feeding path R22 is branched off at a second branch point A2. The re-feeding path R22 connects the second branch point A2 of the side path R21 to a re-feeding point A3 in the upstream of the conveyance path R1 with respect to the secondary transfer roller 9.

In the side path R21, conveyance roller pairs 31, 32 are disposed between the second branch point A2 and the switching gate 30. Further, conveyance roller pairs 33, 34 are disposed between the second branch point A2 and the junction A1. The conveyance roller pairs 31, 32 have the same configuration as the above-described conveyance roller pairs 23 to 27. The conveyance roller pairs 33, 34 have approximately the same configuration as the above-described conveyance roller pairs 23 to 27 but can be rotary driven in a reverse direction. The long sheet P1 that is conveyed into the side path R21 by the switching gate 30 is further conveyed in the arrow direction in FIG. 3 by the conveyance roller pairs 31 to 34 toward the junction A1 (draw-in operation). Then, based on a detection result of a sensor provided at the second branch point A2, the conveyance of the long sheet P1 is stopped when the rear end of the long sheet P1 passes the second branch point A2 (i.e. reaches a section between the second branch point A2 and the junction A1) as illustrated in FIG. 4. The draw-in operation is thus completed. In this step, depending on the sheet length of the long sheet P1, the front end of the long sheet P1 may enter the conveyance path R1 through the junction A1 to reach the secondary transfer roller 9 or the fixer 50 as illustrated in FIG. 4.

After the draw-in operation, the conveyance roller pairs 33, 34 are rotary driven in the reverse direction to convey the long sheet P1 in the side path R21 backward into the re-feeding path R22 through the second branch point A2 (re-feeding operation). In the re-feeding path R22, conveyance roller pairs 35 to 39 are disposed. The conveyance roller pairs 35 to 39 have the same configuration as the above-described conveyance roller pairs 23 to 27. The long sheet P1 conveyed into the re-feeding path R22 is further conveyed from the second branch point A2 to the re-feeding point A3 in the arrow direction as illustrated in FIG. 5 and then into the conveyance path R1 through the re-feeding point A3 by the conveyance roller pairs 35 to 39. As a result, the long sheet P1 is flipped.

The ejection roller 28, the switching gate 30 and the conveyance roller pairs 31 to 39 also constitute the above-described sheet conveyer 20.

Figure 6:
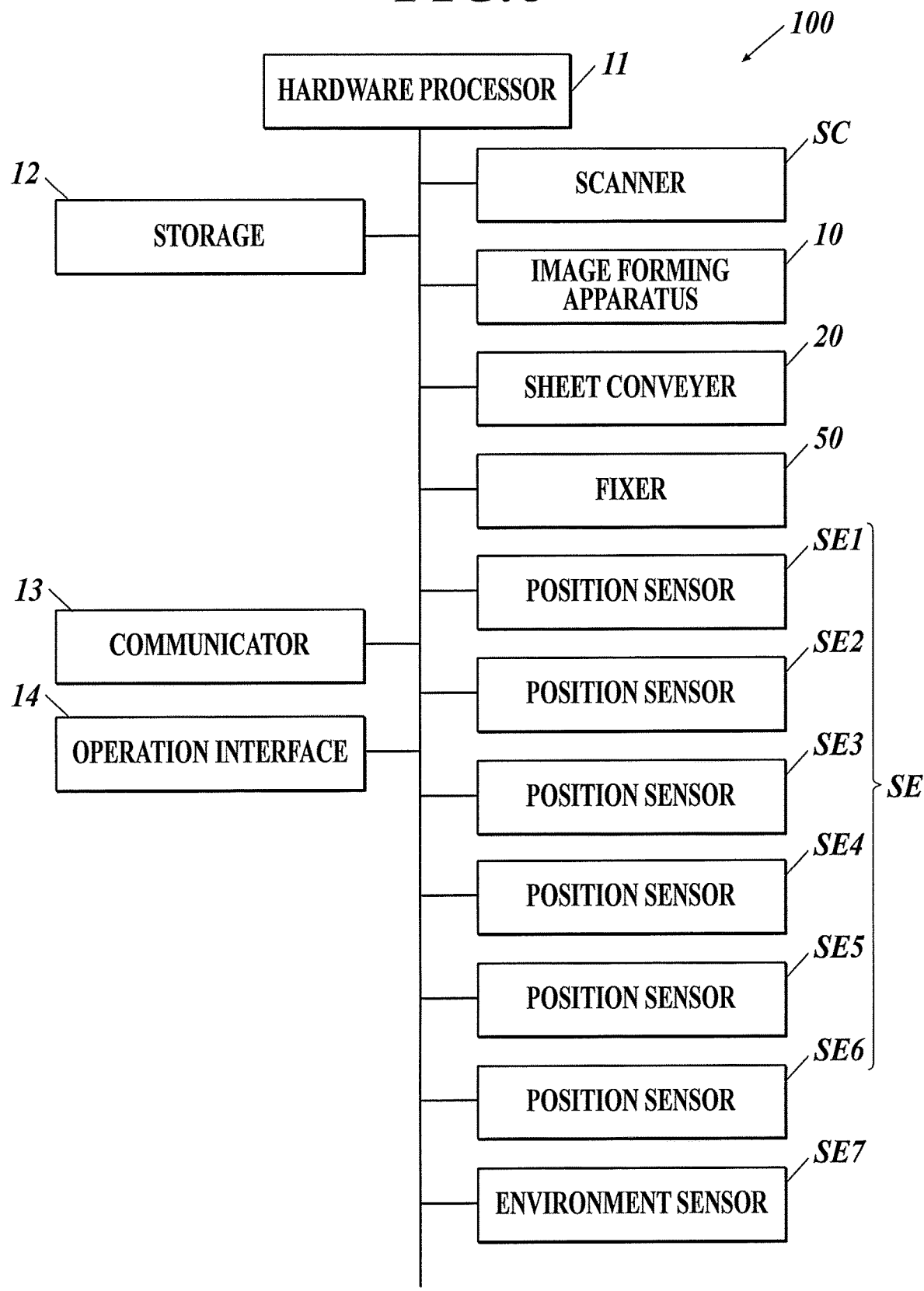
FIG. 6 is a schematic block diagram of the control configuration of the image forming apparatus in FIG. 1.

FIG. 6 is a schematic block diagram of the control configuration of the image forming apparatus 100 of the embodiment.

As illustrated in FIG. 6, the hardware processor 11 is connected to a storage 12, a communicator 13, an operation interface 14, the scanner SC, the image former 10, the sheet conveyer 20, the fixer 50, the position sensors SE1 to SE6 and an environment sensor SE7.

The hardware processor 11 is constituted by a CPU (central processing unit), a RAM (random access memory) and the like. The CPU of the hardware processor 11 reads a system program and processing programs stored in the storage 12, develop them in the RAM and integrally controls the components of the image forming apparatus 100 according to the developed programs. For example, when a job execution command is input through the operation interface 14, the hardware processor 11 executes the job so as to form a toner image on the long sheet P1 based on image data input from the scanner SC or the communicator 13. Further, when a job execution command is input through the operation interface 14, the hardware processor 11 executes a long sheet flipping control processing (described later) so as to control the pressure contact/separation of the conveyance roller pairs 25 to 27, the secondary transfer roller 9 and the fixing members 51, 52 during the job.

The storage 12, which is constituted by a non-volatile semiconductor memory, an HDD (a hard disk drive) or the like, stores the variety of programs to be executed by the hardware processor 11 and parameters and data necessary for the components.

The communicator 13 includes a variety of interfaces such as an NIC (network interface card), a MODEM (modulator-demodulator) and a USB (universal serial bus).

The operation interface 14 outputs a variety of information set by the user to the hardware processor 11. For example, the operation interface 14 may be constituted by a touch panel on which the user can input operations according to information on a display. Through the operation interface 14, the user can set printing conditions, i.e. the type (e.g. size, sheet type, basis weight, etc.) of the long sheet P1, a sheet feeding tray to be used, image density, magnification, simplex/duplex printing and the like. Further, the user can input a job execution command or a command to enter an adjustment mode through the operation interface 14. The hardware processor 11 can control the operation interface 14 to display a variety of information to the user on the operation interface 14.

For example, the environment sensor SE7 includes a temperature sensor, a humidity sensor and the like. The environment sensor SE7 detects the temperature and the humidity inside the case of the image forming apparatus 100 and outputs the detection results to the hardware processor 11.

Operation of Image Forming Apparatus 100

Next, an operation of the image forming apparatus 100 according to the first embodiment will be described.

The image forming apparatus 100 performs the long sheet flipping control processing as illustrated in FIG. 7. FIG. 7 is a flowchart of an example of the long sheet flipping control processing. The processing illustrated in the flowchart is performed by the hardware processor 11 in cooperation with the programs stored in the storage 12 according to the job execution command of the user.

As illustrated in FIG. 7, after the job is started, the hardware processor 11 makes a determination as to whether image formation on one side of the long sheet P1 is completed based on the size of the long sheet P1 previously input by the user and image data input from the scanner SC or the communicator 13 (Step S101).

If it is determined that the image formation is not completed yet (Step S101, No), the hardware processor 11 repeats the step S101.

If it is determined that the image formation is completed (Step S101, Yes), the hardware processor 11 starts the draw-in operation (Step S102). Specifically, the hardware processor 11 guides the long sheet P1 with an image formed on one side into the side path R21 by means of the switching gate 30 and further conveys the long sheet P1 toward the junction A1 by means of the conveyance roller pairs 31 to 34 disposed in the side path R21. As a result, the long sheet P1 is conveyed into the conveyance path R1 through the junction A1 to reach sequentially the conveyance roller pairs 25 to 27, the secondary transfer roller 9, the fixer 50 and the like.

Then, the hardware processor 11 makes a determination as to whether arrival of the long sheet P1 is detected at any of the conveyance roller pairs 25 to 27, the secondary transfer roller 9 and the fixing members 51, 52 based on detection results of the position sensors SE1 to SE5 (Step S103).

If it is determined that arrival of the long sheet P1 is detected at any of the pairs (Step S103, Yes), the hardware processor 11 separates the member at which arrival of the long sheet P1 is detected (Step S104). For example, when the position sensors SE1 and SE2 detects the long sheet P1, the hardware processor 11 separates the conveyance roller pairs 25, 26. For another example, when all the position sensors SE1 to SE5 detect the long sheet P1, the hardware processor 11 separates all the conveyance roller pairs 25 to 27, the intermediate transfer belt 6 and the secondary transfer roller 9 and the fixing members 51, 52. When the hardware processor 11 separates the fixing members 51, 52, it moves the guide member 54 to support the long sheet P1 so that the long sheet P1 does not contact the fixing members 51, 52. This can prevent an image defect of the image formed on one side of the long sheet P1.

If it is determined that arrival of the long sheet P1 is not detected in any of the members (Step S103, No), the hardware processor 11 omits Step S104.

Then, the hardware processor 11 makes a determination as to whether the draw-in operation is completed (Step S105). Specifically, a sensor (not shown) disposed at the second branch point A2 detects whether the rear end of the long sheet P1 has passed over the second branch point A2 to reach a section between the second branch point A2 and the junction A1. Based on the detection result, the hardware processor 11 makes a determination as to whether the draw-in operation is completed.

If it is determined that the draw-in operation is not completed yet (Step S105, No), the hardware processor 11 performs Step S103 again.

If it is determined that the draw-in operation is completed (Step S105, Yes), the hardware processor 11 performs the re-feeding operation (step S106). Specifically, the hardware processor 11 rotates the conveyance roller pairs 33, 34 in the reverse direction to convey the long sheet P1 backward into the re-feeding path R22 through the second branch point A2. The hardware processor 11 further conveys the long sheet P1 into the conveyance path R1 through the re-feeding point A3 by means of the conveyance roller pairs 35 to 39 disposed in the re-feeding path R22. As a result, the long sheet P1 is flipped.

This is how the long sheet flipping control processing is performed.

In Step S103, the hardware processor 11 makes a determination as to whether arrival of the long sheet P1 is detected at any of the conveyance roller pairs 25 to 27, the secondary transfer roller 9 and the fixing members 51, 52. However, the determination is not limited thereto. For example, when the conveyance roller pairs 25 to 27 can be rotary driven in both forward and reverse directions, the hardware processor 11 may make a determination as to whether arrival of the long sheet P1 is detected in any of the secondary transfer roller 9 and the fixing members 51, 52. In this case, the detector SE may not include the position sensors SE1 to SE3.

Technical Effects of Embodiment

In the first embodiment, the image forming apparatus 100 includes the conveyance path R1 for conveyance to the image former, the flipping conveyance path R2 including the side path and the re-feeding path, the sheet conveyer 20 that conveys a sheet along the conveyance path R1 and the flipping conveyance path R2 and the hardware processor 11 that controls the conveying operation, the draw-in operation and the re-feeding operation.

Therefore, the image forming apparatus 100 can perform automatic duplex printing without deterioration in durability of the apparatus.

The image forming apparatus 100 further includes the intermediate transfer belt 6 and the secondary transfer roller 9 that are disposed in the conveyance path R1 to transfer a toner image onto a sheet, and the pair of fixing members 51, 52 that is disposed in the conveyance path R1 to fix the toner image transferred on the sheet to form an image. The sheet conveyer 20 conveys a sheet by means of the conveyance roller pairs 23 to 27, 31 to 39 disposed respectively in the conveyance path R1 and the flipping conveyance path R2. The hardware processor 11 specifies a pair which rotates only in the forward direction and at which the sheet is present at the completion of the draw-in operation from among the intermediate transfer belt 6 and the second transfer roller 9, the fixing members 51, 52 and the conveyance roller pairs 25 to 27 disposed in the downstream of the conveyance path R1 with respect to junction A1, and separates at least the specified pair before the re-feeding operation.

With this configuration, the image forming apparatus 100 can perform automatic duplex printing on a sheet that is long relative to the structure of the apparatus. Even when the sheet reaches a pair in the conveyance path R1 that cannot rotate in the reverse direction as a result of the draw-in operation, separating the pair can prevent a breakage or a failure that is caused by forced reverse rotation of the pair in the re-feeding operation.

The image forming apparatus 100 further includes the guide member 54 that guides a sheet to enter the fixing members 51, 52, and the sheet is guided by the guide member 54 so as not to contact the fixing member 51, 52 when the fixing members 51, 52 are separated by a control of the hardware processor 11. This can prevent the sheet with an image on one side from contacting the fixing members 51, 52 and thereby prevent resultant image defects.

The image forming apparatus 100 further includes the detector SE that detects the presence or absence of a sheet individually at the intermediate transfer belt 6 and the secondary transfer roller 9, the fixing members 51, 52, and the conveyance roller pairs 25 to 27 disposed in the downstream of the conveyance path R1 with respect to the junction A1. In the draw-in operation, the hardware processor 11 specifies a pair at which arrival of the sheet is detected by the detector SE from among the intermediate transfer belt 6 and the secondary transfer roller 9, the fixing members 51, 52, and the conveyance roller pairs 25 to 27 disposed in the downstream of the conveyance path R1 with respect to the junction A1, and serially separates the specified pair. This can prevent a breakage or a defect of members more surely. Further, these pairs are separated in the course of the draw-in operation. This can prevent the drawn-in sheet from contacting the secondary transfer roller 9 and the fixer 50 and thereby prevent image defects more surely.

Second Embodiment

Next, a second embodiment will be described. The second embodiment has the same configuration as the first embodiment except for the features described below.

An image forming apparatus 100 of the second embodiment is different from that of the first embodiment in that long sheet flipping control processing is performed as illustrated in FIG. 8. FIG. 8 is a flowchart of an example of the long sheet flipping control processing according to the second embodiment. The processing in the flowchart is performed by a hardware processor 11 in cooperation with programs stored in a storage 12 according to a job execution command of the user.

As illustrated in FIG. 8, after the job is started, the hardware processor 11 makes a determination as to whether image formation on one side of a long sheet P1 is completed based on the size of the long sheet P1 previously input by the user and image data input from a scanner SC or a communicator 13 (Step S201).

If it is determined that the image formation is not completed yet (Step S201, No), the hardware processor 11 repeats the step S201.

If it is determined that the image formation is completed (Step S201, Yes), the hardware processor 11 specifies a pair at which the long sheet P1 is present at the completion of a draw-in operation of the long sheet P1 from among conveyance roller pairs 25 to 27, a secondary transfer roller 9, and fixing members 51, 52 based on the size of the long sheet P1 previously input by the user (Step S202).

Then, the hardware processor 11 separates the pair specified in Step S202 (Step S203). For example, when the hardware processor 11 specifies that the long sheet P1 will be at the conveyance roller pairs 25, 26 at the completion of the draw-in operation, it separates the conveyance roller pairs 25, 26. For another example, when the hardware processor 11 specifies that the long sheet P1 will be at the conveyance roller pairs 25 to 27, the secondary transfer belt 6 and the secondary transfer roller 9 and the fixing members 51, 52 at the completion of the draw-in operation, it separates all the conveyance roller pairs 25 to 27, the secondary transfer roller 9 and the fixing members 51, 52. When the hardware processor 11 separates the fixing members 51, 52, it moves the guide member 54 to support the long sheet P1 so that the long sheet P1 does not contact the fixing members 51, 52. This can prevent an image defect of the image formed on one side of the long sheet P1.

Then, the hardware processor 11 performs a draw-in operation (Step S204) and a re-feeding operation (Step S205).

This is how the long sheet flipping control processing is performed.

In Step S202, the hardware processor 11 specifies a pair at which the long sheet P1 is present at the completion of the draw-in operation of the long sheet P1 from among the conveyance roller pairs 25 to 27, the secondary transfer roller 9 and the fixing members 51, 52. However, the specification is not limited thereto. For example, when the conveyance roller pairs 25 to 27 can be rotary driven in both forward and reverse directions, the hardware processor 11 may specify a pair at which the long sheet P1 is present at the completion of the draw-in operation of the long sheet P1 from among the secondary transfer roller 9 and the fixing members 51, 52.

As in the first embodiment, the image forming apparatus 100 of the second embodiment can perform automatic duplex printing on a sheet that is long relative to the structure of the image forming apparatus 100 without deterioration in durability of the apparatus.

The hardware processor 11 specifies a pair at which the sheet is present at the completion of the draw-in operation based on the size of the sheet from among the intermediate transfer belt 6 and the secondary transfer roller 9, the fixing members 51, 52, and the conveyance roller pairs 25 to 27 disposed in the downstream of a conveyance path R1 with respect to a junction A1, and separates the specified pair after an image is formed on one side of the sheet. This allows the hardware processor 11 to separate the pair before performing the draw-in operation. Even when the sheet reaches a pair in the conveyance path R1 that cannot rotate in the reverse direction in the draw-in operation, separating the pair can prevent a breakage or a defect that is caused by forced reverse rotation of the pair in the re-feeding operation. Further, the pairs are separated before the draw-in operation. This can prevent the drawn-in sheet from contacting the secondary transfer roller 9 and the fixer 50 and thereby prevent an image defect more surely.

Third Embodiment

Next, a third embodiment will be described. The third embodiment has the same configuration as the first embodiment except for the features described below.

An image forming apparatus 100 according to the third embodiment is different from that of the first embodiment in that conveyance roller pairs 25 to 27 can be rotary driven in both forward and reverse directions, and long sheet flipping control processing is performed as illustrated in FIG. 9. FIG. 9 is a flowchart of an example of the long sheet flipping control processing according to the third embodiment. The processing in the flowchart is performed by a hardware processor 11 in cooperation with programs stored in a storage 12 according to a job execution command of the user.

As illustrated in FIG. 9, after the job is started, the hardware processor 11 makes a determination as to whether image formation on one side of a long sheet P1 is completed based on the size of the long sheet P1 previously input by the user and image data input from a scanner SC or a communicator 13 (Step S301).

If it is determined that the image formation is not completed yet (Step S301, No), the hardware processor 11 repeats the step S301.

If it is determined that the image formation is completed (Step S301, No), the hardware processor 11 makes a determination as to whether the size, the sheet type and the basis weight of the long sheet P1 previously input by the user satisfy a predetermined condition (Step S302). Specifically, the hardware processor 11 determines that the predetermined condition is satisfied when the long sheet P1 has such a sheet length that allows the front end of the long sheet P1 to be at a secondary transfer roller 9 at the completion of the draw-in operation and has such a rigidity based on the sheet type and the basis weight that allows the sheet to be conveyed to the downstream even when the secondary transfer roller 9 is not in a pressure contact during a draw-in operation.

If it is determined that the long sheet P1 satisfies the predetermined condition (Step S302, Yes), the hardware processor 11 separates the intermediate transfer belt 6 and the secondary transfer roller 9 from each other (Step S303).

In this step, the long sheet P1, on which an image has been formed on one side and conveyed into the conveyance path R1 through the junction A1 by the draw-in operation, is hot since it has just passed through the fixer 50. When the hot long sheet P1 reaches the secondary transfer roller 9 by the draw-in operation, the temperature of the secondary transfer roller 9 and the intermediate transfer belt 6 may be increased to cause an image defect of an image to be formed on the back side. To avoid this, when the long sheet P1 satisfies the predetermined condition, the intermediate transfer belt 6 and the secondary transfer roller 9 are separated from each other prior to the draw-in operation so that such image defects can be prevented.

If it is determined that the long sheet P1 does not satisfy the predetermined condition (Step S302, No), the hardware processor 11 omits Step S303.

Then, the hardware processor 11 performs the draw-in operation (Step S304).

Then, the hardware processor 11 separates the intermediate transfer belt 6 and the secondary transfer roller 9, fixing members 51, 52 and also moves the guide member 54 so that the long sheet P1 does not contact the fixing members 51, 52 (Step S305). If the intermediate transfer belt 6 and the secondary transfer roller 9 are already separated from each other as a result of Step S303, the hardware processor 11 separates only the fixing members 51, 52.

Then, the hardware processor 11 performs a re-feeding operation (Step S306). Specifically, the hardware processor 11 rotates the conveyance roller pairs 25 to 27, 33, 34 in the reverse direction to convey the long sheet P1 backward into the re-feeding path R22 through the second branch point A2. Then, the hardware processor 11 conveys the long sheet P1 into the conveyance path R1 through the re-feeding point A3 by means of the conveyance roller pairs 35 to 39 disposed in the re-feeding path R22. As a result, the long sheet P1 is flipped.

This is how the long sheet flipping operation is performed.

The above-described long sheet flipping control processing involves Step S302 and Step S303. However, the processing is not limited thereto and may not involve Step S302 and Step S303.

In the above-described long sheet flipping control processing, the conveyance roller pairs 25 to 27 can be rotary driven in both forward and reverse directions, Step S305 involves separating the intermediate transfer belt 6 and the secondary transfer roller 9 and the fixing members 51, 52, and Step S306 involves conveying the long sheet P1 backward by means of the conveyance roller pairs 25 to 27, 33, 34. However, the control is not limited thereto. That is, the conveyance roller pairs 25 to 27 may be rotary driven only in the forward direction, Step S305 may involve separating the conveyance roller pairs 25 to 27, the intermediate transfer belt 6 and the secondary transfer roller 9 and the fixing members 51, 52, and Step 306 may involve conveying the long sheet P1 backward by means of the conveyance roller pairs 33, 34.

In the above-described processing, Step S306 involves rotating the conveyance roller pairs 25 to 27 in the reverse direction. However, the control is not limited thereto. For example, the hardware processor 11 may specify a pair at which the long sheet P1 is detected at the completion of the draw-in operation by position sensors SE1 to SE3 from among the conveyance roller pairs 25 to 27, and rotate the specified pair in the reverse direction.

As in the first embodiment, the image forming apparatus 100 of the third embodiment can perform automatic duplex printing on a sheet that is long relative to the structure of the image forming apparatus 100 without sacrificing the durability of the apparatus.

The hardware processor 11 specifies a pair which can be rotary driven in both forward and reverse directions and at which the sheet is located at the completion of the draw-in operation is complete from among the conveyance roller pairs 25 to 27 disposed in the downstream of the conveyance path R1 with respect to the junction A1, and rotates the specified pair in the reverse direction to convey the sheet in the re-feeding operation. This can improve the reliability of the re-feeding operation when the sheet is thick or has high basis weight.

The hardware processor 11 separates the intermediate transfer belt 6 and the secondary transfer roller 9 prior to the draw-in operation when the size, the sheet type and the basis weight of the sheet satisfy the predetermined condition. This can prevent the intermediate transfer belt 6 and the secondary transfer roller 9 from contacting the sheet heated in the image formation on one side and from a resultant increase in temperature. As a result, an image defect due to an increase in temperature of the intermediate transfer belt 6 and the secondary transfer roller 9 can be prevented.

The hardware processor 11 may specify a pair which can be rotary driven only in the forward direction and at which the sheet is located at the completion of the draw-in operation from among the intermediate transfer belt 6 and the secondary transfer roller 9, the fixing members 51, 52 and the conveyance roller pairs 25 to 27 disposed in the downstream of the conveyance path R1 with respect to the junction A1, and separates at least the specified pair before the re-feeding operation after the draw-in operation. In this case, even when the sheet reaches a pair in the conveyance path R1 that cannot rotate in the reverse direction in the draw-in operation, separating the pair can prevent a breakage or a defect that is caused by forced reverse rotation of the pair in the re-feeding operation. Further, the pair is separated after the draw-in operation is completed. This can prevent the occurrence of a jam in the draw-in operation more surely, and the sheet can be drawn into the conveyance path R1 more surely.

In the above-described first to third embodiments, the fixer 50 includes the guide member 54. However, it may not include the guide member 54. In this case, for example, an air separation fan (not shown) may be provided to blow air to the fixation nip so as to efficiently separate the sheet passing through the fixation nip from the fixing members 51, 52. When the fixing members 51, 52 are separated, the hardware processor 11 may control the amount of air blown by the air separation fan so that the sheet does not contact the fixing members 51, 52.

In the above-described first to third embodiments, the guide member 54 is movable by a control of the hardware processor 11. However, the guide member 54 is not limited thereto. For example, the guide member 54 may be configured such that it does not move but pops up a protrusion by a control of the hardware processor 11 so as to guide the sheet.

In the above-described first to third embodiments, a standard-size sheet P0 is fed from the feeding tray 21. However, the tray is not limited thereto, and the sheet may be fed from the manual feeding tray 42.

In the above-described first to third embodiments, the sheet conveyer 20 includes the conveyance roller pairs 23 to 27, 31 to 39 disposed in the conveyance path R1 and the flipping conveyance path R2. However, the configuration is not limited thereto. That is, the sheet conveyer 20 may include a larger or smaller number of conveyance roller pairs. It is only necessary that the distance between the conveyance roller pairs is shorter than the sheet length of a sheet to be conveyed.

In the second and third embodiments, the image forming apparatus 100 includes the detector SE. However, the configuration is not limited thereto, and the image forming apparatus 100 may not include the detector SE.

In the above-described first to third embodiments, the image forming apparatus 100 can perform only one of different types of long sheet flipping control processing. However, the image forming apparatus 100 is not limited thereto. That is, the same image forming apparatus 100 may be configured to be able to perform two or three of the above-described different types of long sheet flipping control processing. In this case, the type of long sheet flipping control processing to be performed may be determined according to a user input or by the hardware processor 11 based on the internal configuration of the apparatus, the type of sheet and the like.

In the above-described first to third embodiments, at least one of the pairs of the intermediate transfer belt 6 and the secondary transfer roller 9, the fixing members 51, 52 and the conveyance roller pairs 25 to 27 is separated at a predetermined timing. However, the pair to be separated is not limited thereto. For example, any pair disposed in the downstream of the conveyance path R1 with respect to the fixer 50 may also be separated which can be rotary driven only in the forward direction and at which the sheet is located at the completion of the draw-in operation.

Fourth Embodiment

Next, a fourth embodiment will be described. The fourth embodiment has the same configuration as the above-described first embodiment except for the features described below.

Figure 10A:
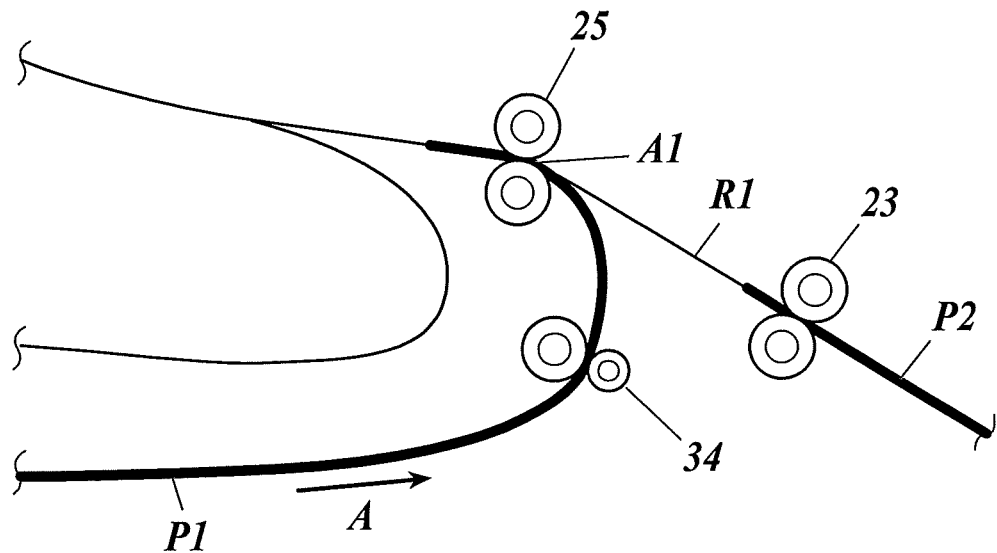
FIG. 10A illustrates a simultaneous conveying operation.
Figure 10B:
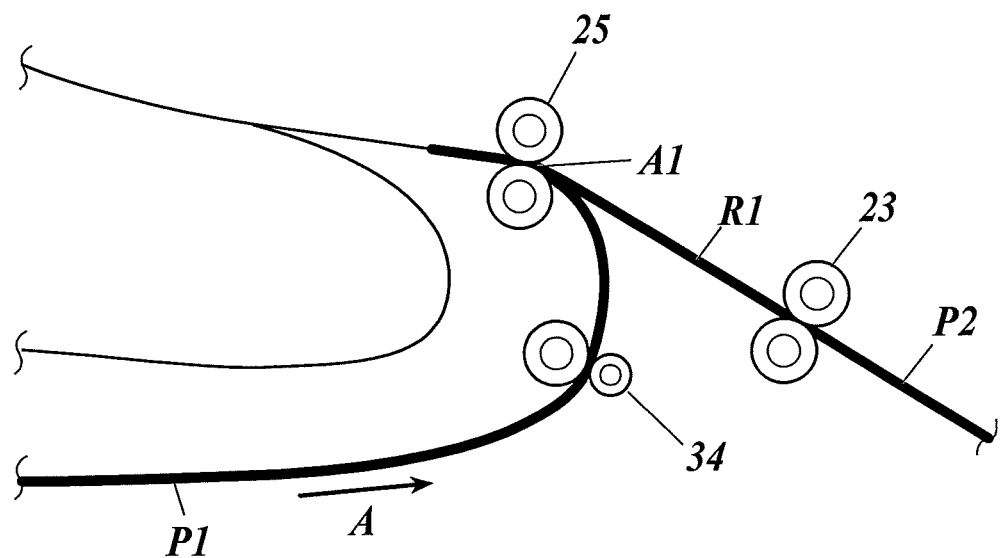
FIG. 10B illustrates a simultaneous conveying operation.
Figure 11:
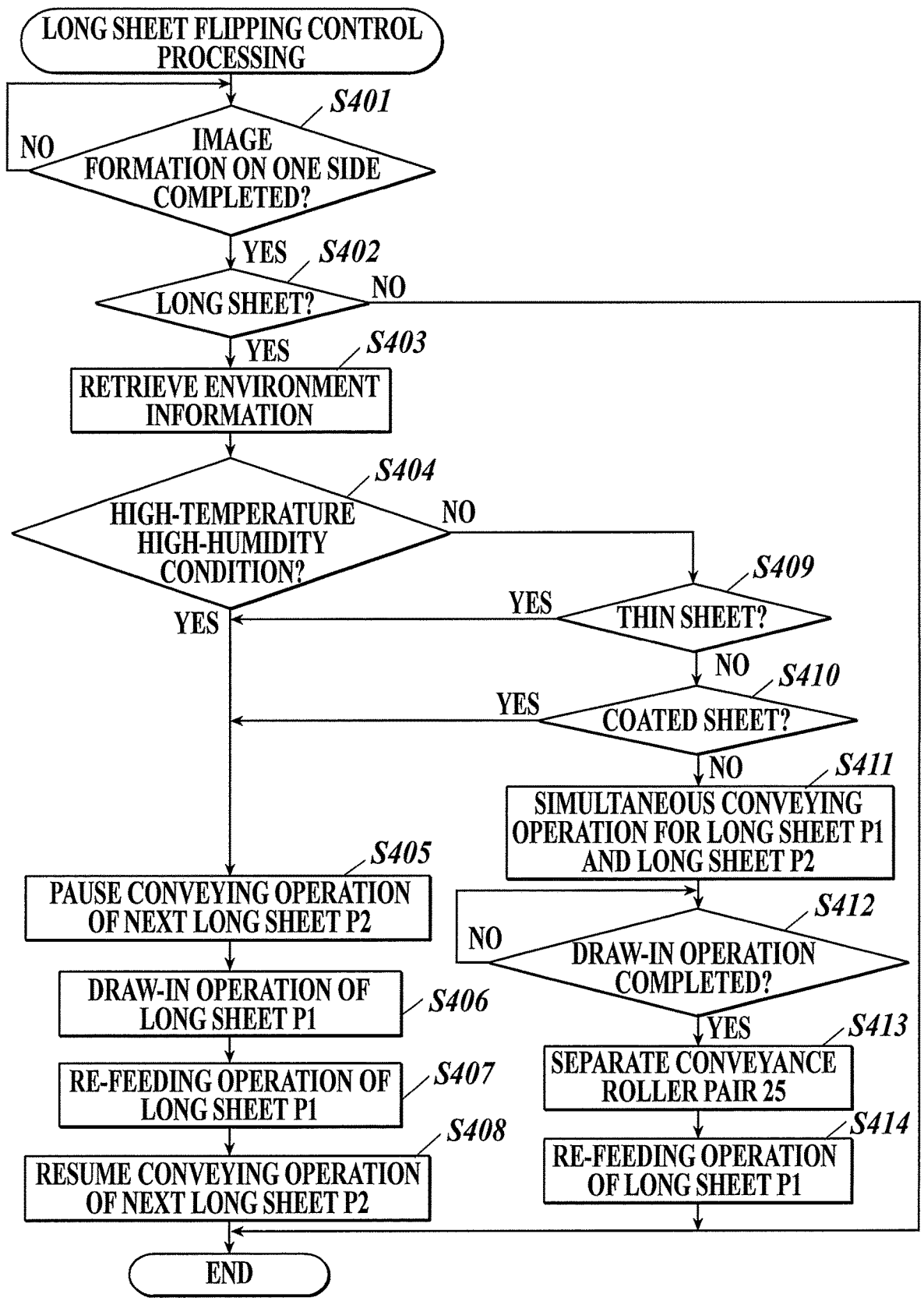
FIG. 11 is a flowchart of long sheet flipping control processing that is performed in a fourth embodiment by the hardware processor in FIG. 6.

An image forming apparatus 100 according to the fourth embodiment is different from that of the first embodiment in that it performs simultaneous conveying operation as illustrated in FIG. 10A and FIG. 10B and long sheet flipping control processing as illustrated in FIG. 11.

As described above, when the image forming apparatus 100 performs duplex printing on a long sheet P1 (first sheet), the front end of the long sheet P1 may enter the conveyance path R1 through the junction A1 to reach the nipping portion of the conveyance roller pair 25 in a draw-in operation.

In such cases, a next long sheet P2 (second sheet) may be stopped in the upstream with respect to the junction A1 until the front end of the long sheet P1 is retracted from the conveyance path R1 in a re-feeding operation. However, this results in a long waiting time and decreases the productivity.

To avoid this, the image forming apparatus 100 of the embodiment conveys the next long sheet P2 in the conveyance path R1 in a predetermined image forming condition (sheet type, basis weight, environment, etc.). That is, a flipping operation of the long sheet P1 after image formation on the first side is performed simultaneously with a conveying operation of the next long sheet P2 before image formation on the first side in order to reduce the working time and improve the productivity (hereinafter referred to as a simultaneous conveying operation).

The simultaneous conveying operation will be described referring to FIG. 10A and FIG. 10B. FIG. 10A illustrates the state of the long sheet P1 and the long sheet P2 when the simultaneous conveying operation is not performed, and FIG. 10B illustrates the state of the long sheet P1 and the long sheet P2 when the simultaneous conveying operation is performed.

As illustrated in FIG. 10A, the long sheet P1 is conveyed in the arrow direction in FIG. 10A by the draw-in operation for the long sheet P1, and the front end thereof enters the conveyance path R1 through the junction A1. When the simultaneous conveying operation is not performed, the next long sheet P2 is stopped by a conveying means disposed in the upstream with respect to the junction A1 such as a conveyance roller pair 23 in the conveyance path R1. After the draw-in operation of the long sheet P1 is completed and the long sheet P1 is completely retracted in the side path R21 by a re-feeding operation, the conveyance of the long sheet P2 is resumed.

In contrast, when the simultaneous conveying operation is performed, a conveying operation of the long sheet P2 is performed in the middle of the draw-in operation of the long sheet P1 as illustrated in FIG. 10B. That is, although the long sheet P1 contacts the long sheet P2 near the conveyance roller pair 25, the conveyance of the long sheet P2 is continued without a pause.

In this regard, the conveyance roller pair 25 may be separated in the re-feeding operation so that the friction between the two long sheets P1, P2 moving in mutually opposite directions can be reduced. It is preferred to separate the conveyance roller pair 25 after completion of the draw-in operation of the long sheet P1. This is because while the draw-in operation is achieved by rotation of the conveyance roller pairs 33, 34, forward rotation of the conveyance roller pair 25 can further stabilize entry of the long sheet P1 into the conveyance path R1.

The rear end of the long sheet P1 is detected by a position sensor SE1, and a hardware processor 11 controls the simultaneous conveying operation based on the detection result.

The sheet type of the long sheet P1 refers to the basis weight thereof. For example, when the basis weight is less than 64 g/m$^2$, it may be sometimes difficult to stably convey the long sheet P1 due to the low rigidity. When the simultaneous conveying operation is performed in such cases, a contact between the two long sheets P1, P2 near the conveyance roller pair 25 may destabilize the conveyance. To avoid this, the simultaneous conveying operation is not performed when the basis weight of the long sheet P1 is low. In contrast, when the basis weight of the sheet is greater than 128 g/m$^2$, it is possible to improve the productivity since the simultaneous conveying operation does not have a significant influence on the stability of the conveyance.

The sheet type of the long sheet P1 refers to the sheet characteristics. For example, the simultaneous conveying operation may not be performed when the sheet is easily scratched, e.g. the sheet is a coated board paper with a basis weight of 256 g/m$^2$ or more. The long sheet P1 that is conveyed in the side path R21 enters the conveyance path R1 with the image forming side facing the long sheet P2. When contact of the long sheet P1 with the long sheet P2 may cause a damage on an image, it is preferred not to perform the simultaneous conveying operation.

For example, the environment refers to temperature and humidity, and the simultaneous conveying operation is not performed in a high-temperature high-humidity condition. That is, since the rigidity of the long sheet P1 tends to be decreased and the friction between the two long sheets P1, P2 tends to be increased in a high-temperature high-humidity condition, it is preferred not to perform the simultaneous conveying operation in such conditions.

The temperature, humidity and the like are detected by the environment sensor SE7. For example, high humidity means a humidity of 70% or more, and high temperature means a temperature of 28° C. or more.

FIG. 11 is a flowchart of an example of the long sheet flipping control processing according to the fourth embodiment. The processing in the flowchart is performed by a hardware processor 11 in cooperation with programs stored in a storage 12 according to a job execution command of the user.

As illustrated in FIG. 11, after the job is started, the hardware processor 11 makes a determination as to whether image formation on one side of a sheet is completed based on the size of the sheet previously input by the user and image data input from a scanner SC or a communicator 13 (Step S401).

If the hardware processor 11 determines that the image formation on one side of the sheet is not completed yet (Step S401, No), it repeats Step S401. If the hardware processor 11 determines that the image formation is completed (Step S401, Yes), the control continues with Step S402.

In Step S402, the hardware processor 11 retrieves sheet information and makes a determination as to whether the sheet is a long sheet. The sheet information includes length in the conveying direction, the basis weight, the sheet characteristics and the like of the sheet. The hardware processor 11 retrieves sheet information previously input by the user and sheet information read by the scanner. If the hardware processor 11 determines that the sheet is not a long sheet (Step S402, No), the long sheet flipping control processing ends. If the hardware processor 11 determines that the sheet is a long sheet (Step S402, Yes), the control continues with Step S403. The sheet that is to be processed in Step S403 or later is referred to as a long sheet P1.

Subsequently, the hardware processor 11 retrieves environment information in Step S403. As used herein, the environment information refers to information on the temperature, the humidity and the like inside the case of the image forming apparatus 100. The hardware processor 11 retrieves environment information detected by the environment sensor SE7.

Then, the hardware processor 11 makes a determination as to whether it is in a high-temperature high-humidity condition based on the environment information (Step S404). If the hardware processor 11 determines that it is not in a high-temperature high-humidity condition (Step S404, No), the control continues with Step S409. If the hardware processor 11 determines that it is in a high-temperature high-humidity condition (Step S404, Yes), the control continues with Step S405.

In Step S405, the hardware processor 11 stops the conveying operation of a next long sheet P2 following the long sheet P1. Specifically, the long sheet P2 is stopped by a conveying means disposed in the upstream with respect to the junction A1 such as a conveyance roller pair 23.

Then, the hardware processor 11 performs the draw-in operation of the long sheet P1 (Step S406) and the re-feeding operation of the long sheet P1 (Step S407).

Specifically, in the draw-in operation, the hardware processor 11 guides the long sheet P1 with an image on one side into a side path R21 by means of a switching gate 30 and then conveys the long sheet P1 toward the junction A1 by means of conveyance roller pairs 31 to 34 disposed in the side path R21. As a result, the long sheet P1 is conveyed into the conveyance path R1 through the junction A1 to reach sequentially the conveyance roller pairs 25 to 27, the secondary transfer roller 9, the fixer 50 and the like. Specifically, in the re-feeding operation, the hardware processor 11 rotates the conveyance roller pairs 33, 34 in the reverse direction to convey the long sheet P1 backward into the re-feeding path R22 through the second branch point A2. Then, the hardware processor 11 further conveys the long sheet P1 into the conveyance path R1 through the re-feeding point A3 by means of conveyance roller pairs 35 to 39 disposed in the re-feeding path R22. As a result, the long sheet P1 is flipped.

When the hardware processor 11 finishes flipping the long sheet P1, it resumes the conveying operation of the long sheet P2 (Step S408). The hardware processor 11 conveys the long sheet P2 to the conveyance path R1 and forms an image thereon.

In Step S409, the hardware processor 11 makes a determination as to whether the long sheet P1 is a thin sheet. As used herein, a thin sheet refers to a sheet that has a basis weight of less than 64 g/m$^2$. However, the definition is not limited thereto. If the hardware processor 11 determines that the long sheet P1 is a thin sheet (Step S409, Yes), the control continues with Step S405. If the hardware processor 11 determines that the long sheet P1 is not a thin sheet (Step S409, No), the control continues with Step S410.

In Step S410, the hardware processor 11 makes a determination as to whether the long sheet P1 is a coated board sheet. As used herein, a board sheet refers to a sheet that has a basis weight of 256 g/m$^2$ or more as described above. However, the definition is not limited thereto. If the hardware processor 11 determines that the long sheet P1 is a coated sheet (Step S410, Yes), the control continues with Step S405. If the hardware processor 11 determines that the long sheet P1 is not a coated sheet (Step S410, No), the control continues with Step S411.

In Step S411, the hardware processor 11 performs the simultaneous conveying operation for the long sheet P1 and the long sheet P2. That is, the hardware processor 11 performs both the draw-in operation of the long sheet P1 and the conveying operation of the long sheet P2.

Subsequently, the hardware processor 11 makes a determination as to whether the draw-in operation of the long sheet P1 is completed (Step S412). In this step, the hardware processor 11 determines that the draw-in operation of the long sheet P1 is completed when the position sensor SE1 detects the rear end of the long sheet P1. The hardware processor 11 retrieves the detection result of the position sensor SE1 to perform Step S411.

If the hardware processor 11 determines that the draw-in operation of the long sheet P1 is not completed yet (Step S412, No), it repeats Step S411. If the hardware processor 11 determines that the draw-in operation of the long sheet P1 is completed (Step S412, Yes), the control continues with Step S413.

In Step S413, the hardware processor 11 separates the conveyance roller pair 25. Then, the hardware processor 11 performs the re-feeding operation of the long sheet P1 (Step S414). As a result, the long sheet P1 is flipped. Sine the hardware processor 11 continues the conveying operation of the long sheet P2 during the re-feeding operation, the long sheet P1 contacts the long sheet P2 near the conveyance roller pair 25.

This is how the long sheet flipping control processing is performed.

As in the first embodiment, the image forming apparatus 100 of the fourth embodiment can perform automatic duplex printing on a sheet that is long relative to the structure of the image forming apparatus 100 without sacrificing the durability of the apparatus.

Further, during the draw-in operation and the re-feeding operation of the long sheet P1 having a length in the conveying direction greater than the path length between the second branch point A2 and the junction A1, the hardware processor 11 performs the conveying operation of the long sheet P2 so that a part of the next long sheet P2 overlaps a part of the long sheet P1 that extends out to the conveyance path A1 from the junction A1. That is, the flipping operation of the long sheet P1 can be performed simultaneously with the conveying operation of the long sheet P2. This can reduce a wasteful waiting time and improve the productivity.

The simultaneous conveying operation is performed in the predetermined image forming condition (sheet type, basis weight, environment, etc.). This enables changing the control according to the image forming condition and can thereby stabilize conveyance in various conditions.

The sheet conveyer 20 includes the conveyance roller pairs disposed in the conveyance path R1, and the hardware processor 11 specifies a roller pair at which the long sheet P1 is present at the completion of the draw-in operation from among the roller pairs and separates the specified roller pair. This can reduce the friction between two long sheets that moves in mutually opposite directions, so as to reduce the occurrence of a damage on the image formed on the long sheet P1.

Further, in the simultaneous conveying operation, the sheet conveyer 20 separates the conveyance roller pair 25 after completion of the draw-in operation of the long sheet P1. That is, the conveyance roller pair 25 is in pressure contact only when the long sheet P1 and the long sheet P2 move in the same direction, and it is separated only when they move in mutually opposite directions. This can stabilize the conveyance when the sheets are conveyed in the same direction and reduce the friction between the sheets when they are conveyed in mutually opposite directions.

The above-described long sheet flipping control processing according to the fourth embodiment is an example in which the sheet characteristics to be used for determination is coating of a sheet. However, the sheet type is not limited thereto, and other sheet characteristics that have an influence on conveyance of the sheet may be used for determination.

In addition to the above-described fourth embodiment, image information may be included in the image forming conditions. For example, a determination as to whether the image to be formed on the long sheet P1 is a text image may be made. When the image on the long sheet P1 is a text image, the simultaneous conveying operation is performed. As described above, a contact between the two long sheets may cause a scratch of the image formed on the long sheet P1. When the image is not largely impaired by a slight defect, i.e. when the image is a text image or the like, the simultaneous conveying operation is performed to improve the productivity.

Further, the image information may include the coverage of the image formed on the long sheet P1. When the image on the long sheet P1 is not largely impaired by a scratch, i.e. when the image is a low-coverage image, the simultaneous conveying operation is performed to improve the productivity.

In the fourth embodiment, the conveyance roller pair 25 is separated after completion of the draw-in operation of the long sheet P1. However, the timing of separation is not limited thereto. For example, the conveyance roller pair 25 may be separated before the long sheet P2 reaches the conveyance roller pair 25. That is, the hardware processor 11 separates the conveyance roller pair 25 that nips the long sheet P1 and thereafter conveys the long sheet P2 to the conveyance roller pair 25. This can reduce the friction between the sheets more effectively.

In this case, the hardware processor 11 performs the draw-in operation of the long sheet P1 in Step S411, makes a determination as to whether the draw-in operation is completed (Step S412) and separates the conveyance roller pair 25 (Step S413). The hardware processor 11 then conveys the long sheet P2 to the conveyance roller pair 25 while performing the re-feeding operation of the long sheet P1 (Step S414).

Fifth Embodiment

Next, a fifth embodiment will be described. The fifth embodiment has the same configuration as the first embodiment except for the features described below.

Figure 12:
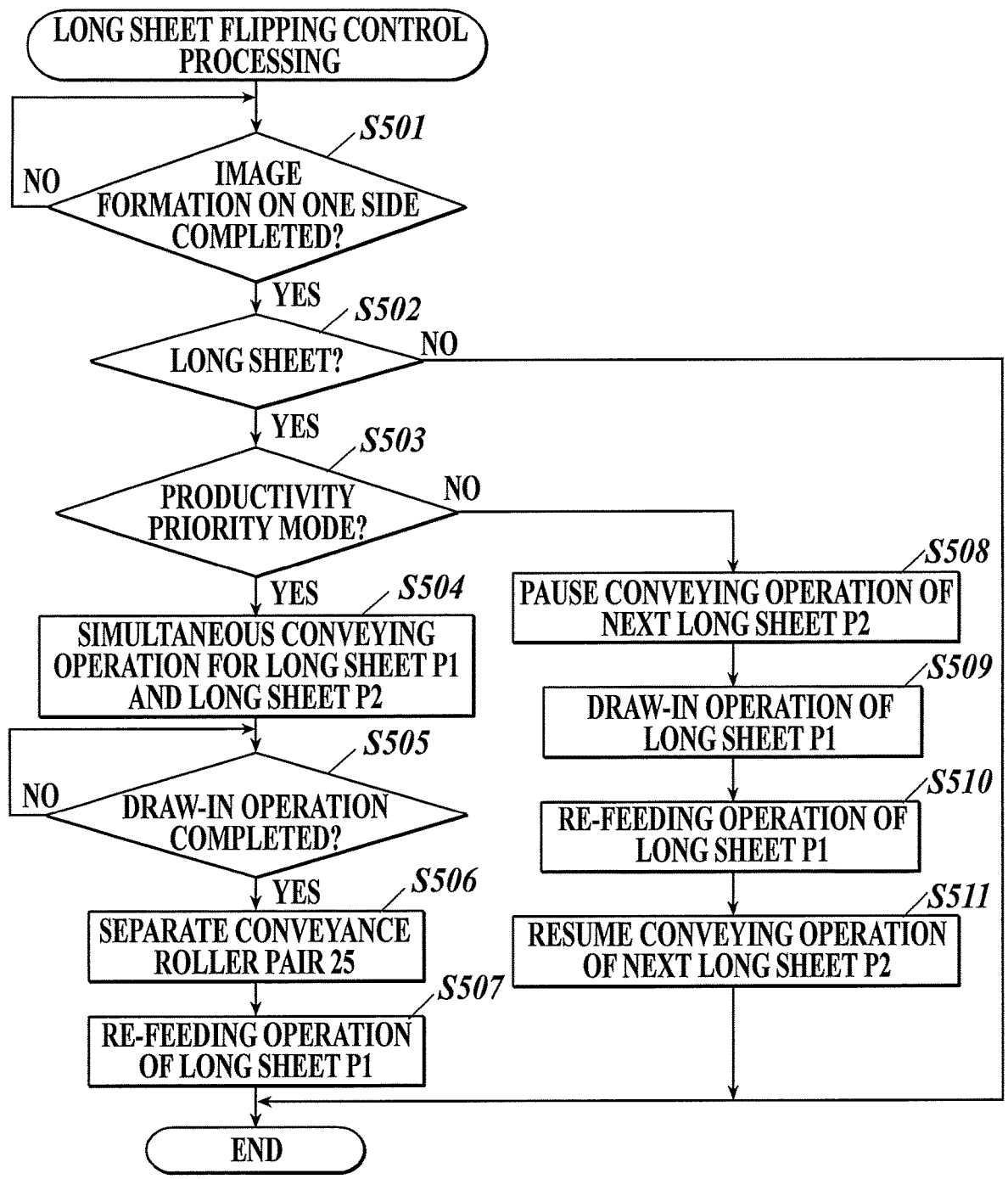
FIG. 12 is a flowchart of long sheet flipping control processing that is performed in a fifth embodiment by the hardware processor in FIG. 6.

An image forming apparatus 100 of the fifth embodiment is different from that of the first embodiment in that it performs long sheet flipping control processing in either productivity priority mode or quality priority mode and that it performs the long sheet flipping control processing as illustrated in FIG. 12.

In the productivity priority mode, the simultaneous conveying operation is performed when a long sheet is flipped. As described above, this can improve the efficiency of an image forming operation and the productivity. In the quality priority mode, the simultaneous conveying operation is not performed but a next sheet stays in the upstream when a long sheet is flipped. As described above, this can prevent a scratch and the like of an image.

The image forming apparatus 100 according to the embodiment is configured such that the user can select either the productivity priority mode or the quality priority mode on an operation interface 14 or through a communicator 13.

FIG. 12 is a flowchart of an example of the long sheet flipping control processing according to the fifth embodiment. The processing in the flowchart is performed by a hardware processor 11 in cooperation with programs stored in a storage 12 according to a job execution command of the user.

As illustrated in FIG. 12, after the job is started, the hardware processor 11 makes a determination as to whether image formation on one side of a sheet is completed (Step S501). If the hardware processor 11 determines that the image formation on one side is not completed yet (Step S501, No), it repeats Step S501. If the hardware processor 11 determines that the image formation on one side is completed (Step S501, Yes), the control continues with Step S502.

In Step S502, the hardware processor 11 retrieves sheet information and makes a determination as to whether the sheet is a long sheet. If the hardware processor 11 determines that the sheet is not a long sheet (Step S502, No), the long sheet flipping control processing ends. If the hardware processor 11 determines that the sheet is a long sheet (Step S502, Yes), the control continues with Step S503. The sheet to be processed in Step S503 or later is referred to as a long sheet P1.

In Step S503, the hardware processor 11 makes a determination as to whether the productivity priority mode is selected by the user. If the hardware processor 11 determines that the productivity priority mode is selected by the user (Step S503, Yes), the control continues with Step S504. If the hardware processor 11 determines that the productivity priority mode is not selected by the user (Step S503, No), i.e. the quality priority mode is selected by the user, the control continues with Step S508.

In Step S504, the hardware processor 11 performs the simultaneous conveying operation for the long sheet P1 and a long sheet P2. Subsequently, the hardware processor 11 makes a determination as to whether a draw-in operation of the long sheet P1 is completed (Step S505). If the hardware processor 11 determines that the draw-in operation is not completed yet (Step S505, No), it repeats Step S505. If the hardware processor 11 determines that the draw-in operation is completed (Step S505, Yes), the control continues with Step S506.

In Step S506, the hardware processor 11 separates a conveyance roller pair 25. Then, the hardware processor 11 performs a re-feeding operation of the long sheet P1 (Step S507). As a result, the long sheet P1 is flipped.

In Step S508, the hardware processor 11 stops a conveying operation of the long sheet P2. Then, the hardware processor 11 performs the draw-in operation of the long sheet P1 (Step S509) and the re-feeding operation of the long sheet P1 (Step S510). Then, the hardware processor 11 resumes the conveying operation of the long sheet P2 (Step S511). Thereafter, the processing ends.

This is how the long sheet flipping control processing is performed.

As in the first embodiment, the image forming apparatus 100 of the fifth embodiment can perform automatic duplex printing on a sheet that is long relative to the structure of the image forming apparatus 100 without sacrificing the durability of the apparatus.

The hardware processor 11 selects either the productivity priority mode or the quality priority mode according to a user instruction. Therefore, it is possible to improve the productivity or to maintain the image quality according to user preference.

Sixth Embodiment

Next, a sixth embodiment will be described. The sixth embodiment has the same configuration as the first embodiment except for the features described below.

Figure 13:
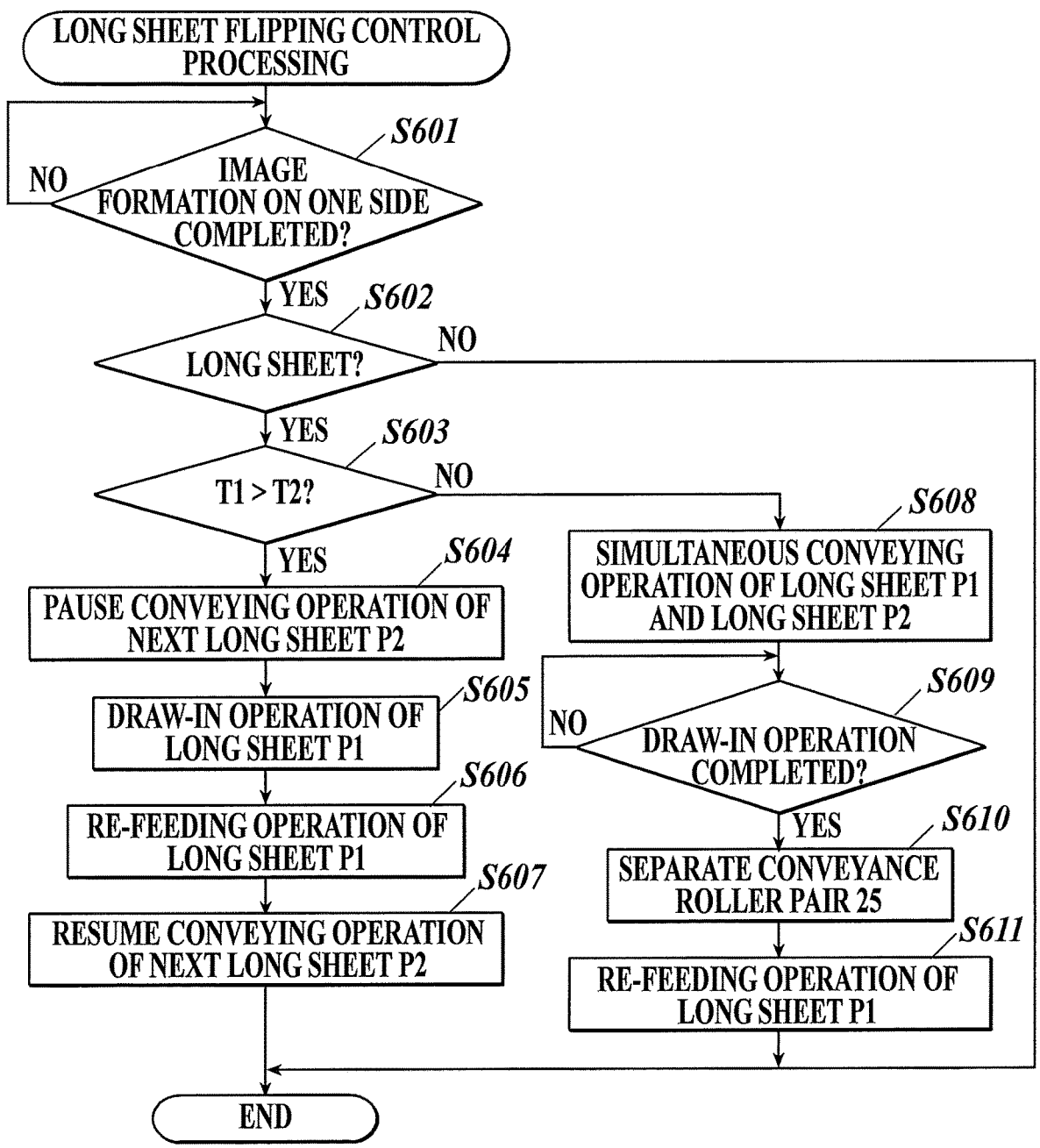
FIG. 13 is a flowchart of long sheet flipping control processing that is performed in a sixth embodiment by the hardware processor in FIG. 6.

An image forming apparatus 100 of the sixth embodiment is different from that of the first embodiment in that it makes a determination as to whether to perform a simultaneous conveying operation according to the length in the conveying direction of a long sheet P1 and that it performs long sheet flipping control processing as illustrated in FIG. 13.

When a rear end passes over a second branch point A2, the draw-in operation of the long sheet P1 is completed, and it becomes possible to perform the re-feeding operation. In the simultaneous conveying operation, a front end of a long sheet P2 in a conveyance path R1 may sometimes reach the second branch point A2 before the long sheet P1 is completely drawn into the re-feeding path R22 through the second branch point A2 by the re-feeding operation depending on the length of the long sheet P1. When this occurs, the long sheet P1 bumps into the long sheet P2 in the side path R21 to cause a conveyance failure and the like.

A feature of the embodiment to avoid this is that when the time (hereinafter referred to as T1) from a certain time point after the start of conveyance of the long sheet P2 until the long sheet P1 is completely drawn in the re-feeding path R22 is longer than the time (hereinafter referred to as T2) from the certain time point until the front end of the long sheet P2 reaches the second branch point A2, the conveying operation of the long sheet P2 is paused while the draw-in operation and the re-feeding operation of the long sheet P1 are performed. That is, image formation on the backside of the long sheet P1 is firstly performed, and thereafter image formation on the long sheet P2 is performed.

When T1 is shorter than T2, the simultaneous conveying operation is performed. That is, image formation on the long sheet P2 is firstly performed, and thereafter image formation on the backside of the long sheet P1 is performed.

FIG. 13 is a flowchart of an example of the long sheet flipping control processing according to the sixth embodiment. The processing in the flowchart is performed by a hardware processor 11 in cooperation with programs stored in a storage 12 according to a job execution command of the user.

As illustrated in FIG. 13, after the job is started, the hardware processor 11 makes a determination as to whether image formation on one side of a sheet is completed (Step S601).

If the hardware processor 11 determines that the image formation on one side is not completed yet (Step S601, No), it repeats Step S601. If the hardware processor 11 determines that the image formation on one side is completed (Step S601, Yes), the control continues with Step S602.

In Step S602, the hardware processor 11 retrieves sheet information and makes a determination as to whether the sheet is a long sheet. As used herein, the sheet information refers to the length in the conveying direction and the like. If the hardware processor 11 determines that the sheet is not a long sheet (Step S602, No), the long sheet flipping control processing ends. If the hardware processor 11 determines that the sheet is a long sheet (Step S602, Yes), the control continues with Step S603. The sheet to be processed in Step S603 or later is referred to as a long sheet P1.

Then, the hardware processor 11 makes a determination as to whether T1>T2 (Step S603). If the hardware processor 11 determines that T1>T2 is true (Step S603, Yes), i.e. the long sheet P2 reaches the second branch point A2 before the long sheet P1 is completely drawn in the re-feeding path R22, the control continues with Step S604. If the hardware processor 11 determines that T1>T2 is false (Step S603, No), the control continues with Step S608.

In Step S604, the hardware processor 11 stops the conveying operation of the long sheet P2. Then, the hardware processor 11 performs the draw-in operation of the long sheet P1 (Step S605) and the re-feeding operation of the long sheet P1 (Step S606). After finishing the re-feeding operation, the hardware processor 11 resumes the conveying operation of the long sheet P2 (Step S607), and the control ends.

In Step S608, the hardware processor 11 performs the simultaneous conveying operation for the long sheet P1 and the long sheet P2. Then, the hardware processor 11 makes a determination as to whether the draw-in operation of the long sheet P1 is completed (Step S609). If the hardware processor 11 determines that the draw-in operation is not completed yet (Step S609, No), it repeats Step S609. If the hardware processor 11 determines that the draw-in operation is completed (Step S609, Yes), it separates a conveyance roller pair 25 (Step S610) and performs the re-feeding operation of the long sheet P1 (Step S611).

As in the first embodiment, the image forming apparatus 100 of the sixth embodiment can perform automatic duplex printing on a sheet that is long relative to the structure of the image forming apparatus 100 without sacrificing the durability of the apparatus.

The hardware processor 11 makes a determination as to whether to perform the simultaneous conveying operation based on the length in the conveying direction of the long sheet P1. When T1 is longer than T2, it pauses the conveying operation of the long sheet P2 while performing the draw-in operation and the re-feeding operation of the long sheet P1. That is, it performs image formation on the backside of the long sheet P1 first and thereafter performs image formation on the long sheet P2. This can prevent conveyance failures and the like. When T1 is shorter than T2, the hardware processor 11 performs the simultaneous conveying operation. That is, it performs image formation on the long sheet P2 first and thereafter performs image formation on the backside of the long sheet P1. This can improve the productivity.

The sixth embodiment may be combined with the fourth embodiment. In the sixth embodiment, the control does not change depending on the image forming conditions. However, the control is not limited thereto. When it is determined that T1>T2 is false in Step S603, a determination as to whether to perform the simultaneous conveying operation may be further made based on the image forming conditions. This enables conveyance considering the image quality.

The sixth embodiment can also be combined with the fifth embodiment. That is, even when it is determined that T1>T2 is false in Step S603, the simultaneous conveying operation is not performed when the quality priority mode is selected by the user. This enables conveyance with priority on the image quality.

Others

The above description of the embodiments illustrates only suitable examples of the image forming apparatus of the present invention, and the present invention is not limited thereto.

For example, the above-described first to sixth embodiments illustrate examples of color image forming apparatuses in which images formed on the photoreceptor drums 1Y to 1K are primary transferred to the intermediate transfer belt 6 and then further transferred from the intermediate transfer belt 6 to a sheet with the secondary transfer roller 9. However, the present invention is also applicable to monochrome image forming apparatuses in which an image is directly transferred from a photoreceptor drum to a sheet with a transfer roller.

The above-described first to sixth embodiments are examples of electrophotographic image forming apparatuses. However, the present invention is not limited thereto. For example, the present invention is also applicable to inkjet image forming apparatuses which record an image on a recording medium by ejecting ink from nozzles and landing them onto the recording medium in a desired pattern (e.g. inkjet recording apparatuses that eject ink curable by a predetermined energy beam from nozzles and irradiate the ink on the recording medium with the predetermined energy beam to cure it so as to fix the ink on the recording medium).

The above description illustrates examples in which a non-volatile memory, a hard disk or the like is used as the computer-readable medium for the program of the present invention. However, the computer-readable medium is not limited thereto. Other computer-readable media that can be used include portable recording media such as CD-ROM. A carrier wave is also applicable as a medium for providing data of a program according to the present invention through a communication line.

Suitable changes can be made without departing from the features of the present invention with regard to the detailed configuration and the detailed operation of the image forming apparatus.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent applications No. 2017-136753 and No. 2017-158970, respectively filed on Jul. 13, 2017 and Aug. 22, 2017, are incorporated herein by reference in their entirety.

What is claimed is:

1. An image forming apparatus, comprising:
an image former which forms an image on a sheet;
a conveyance path for conveying the sheet to the image former;
a flipping conveyance path which comprises a side path connecting a first branch point in a downstream of the conveyance path with respect to the image former to a junction in an upstream of the conveyance path with respect to the image former and a re-feeding path connecting a second branch point in the side path to a re-feeding point in an upstream of the conveyance path with respect to the image former;
a conveying mechanism which conveys the sheet along the conveyance path and the flipping conveyance path; and
a hardware processor which controls the conveying mechanism to perform (i) a conveyance operation to convey the sheet along the conveyance path, (ii) a draw-in operation to draw the sheet with the image on one side into the side path until a rear end of the sheet reaches a section between the second branch point and the junction, and (iii) a re-feeding operation to convey the sheet in a reverse direction to re-feed the flipped sheet from the re-feeding point to the conveyance path through the re-feeding path.

2. The image forming apparatus according to claim 1, further comprising:
a pair of transferring members which is disposed in the conveyance path to transfer a toner image onto the sheet; and
a pair of fixing members which is disposed in the conveyance path to fix the toner image transferred on the sheet to form the image,
wherein the first branch point is in a downstream of the conveyance path with respect to the pair of fixing members, the junction is in an upstream of the conveyance path with respect to the pair of transferring members, and the re-feeding point is in an upstream of the conveyance path with respect to the pair of transferring members,
wherein the conveying mechanism conveys the sheet by means of conveyance roller pairs disposed in the conveyance path and the flipping conveyance path, and
wherein the hardware processor (i) specifies a pair which is rotary driven only in a forward direction and at which the sheet is present at completion of the draw-in operation from among the pair of transferring members, the pair of fixing members and a conveyance roller pair disposed in a downstream of the conveyance path with respect to the junction, and (ii) separates at least the specified pair before the re-feeding operation.

3. The image forming apparatus according to claim 2, further comprising:
a guide member which guides entry of the sheet into the pair of fixing members,
wherein while the pair of fixing members is separated, the hardware processor supports the sheet with the guide member so that the sheet does not contact the pair of fixing members.

4. The image forming apparatus according to claim 2,
wherein the hardware processor (i) specifies a pair which can be rotary driven in both forward and reverse directions and at which the sheet is present at the completion of the draw-in operation from among the conveyance roller pair disposed in the downstream of the conveyance path with respect to the junction, and (ii) rotates the specified pair in the reverse direction to convey the sheet in the re-feeding operation.

5. The image forming apparatus according to claim 2,
wherein the hardware processor separates the pair of transferring members before the draw-in operation when a size, a sheet type and a basis weight of the sheet satisfy a predetermined condition.

6. The image forming apparatus according to claim 2,
wherein the hardware processor (i) specifies a pair which is rotary driven only in the forward direction and at which the sheet is present at the completion of the draw-in operation from among the pair of transferring members, the pair of fixing members and the conveyance roller pair disposed in the downstream of the conveyance path with respect to the junction, and (ii) separates at least the specified pair after the draw-in operation before the re-feeding operation.

7. The image forming apparatus according to claim 2, further comprising:
a detector which detects a presence or absence of the sheet individually at the pair of transferring members, the pair of fixing members and the conveyance roller pair disposed in the downstream of the conveyance path with respect to the junction,
wherein in the draw-in operation, the hardware processor (i) specifies a pair at which arrival of the sheet is detected by the detector from among the pair of transferring members, the pair of fixing members and the conveyance roller pair disposed in the downstream of the conveyance path with respect to the junction, and (ii) serially separates the specified pair.

8. The image forming apparatus according to claim 2,
wherein the hardware processor (i) specifies a pair at which the sheet is present at the completion of the draw-in operation based on a size of the sheet from among the pair of transferring members, the pair of fixing members and the conveyance roller pair disposed in the downstream of the conveyance path with respect to the junction, and (ii) separates the specified pair after forming the image on one side of the sheet.

9. The image forming apparatus according to claim 1,
wherein in the draw-in operation or the re-feeding operation of a first sheet having a sheet length in a conveying direction greater than a path length from the second branch point to the junction, the hardware processor performs a simultaneous conveying operation so as to perform the conveying operation of a next second sheet such that a part of the first sheet extending to the conveyance path out of the junction overlaps a part of the second sheet.

10. The image forming apparatus according to claim 9, wherein the first sheet is a long sheet.

11. The image forming apparatus according to claim 9,
wherein the hardware processor determines whether to perform the simultaneous conveying operation based on at least one of a sheet type of the sheet, a basis weight of the sheet and an environment.

12. The image forming apparatus according to claim 9,
wherein the hardware processor determines whether to perform the simultaneous conveying operation according to a user instruction.

13. The image forming apparatus according to claim 9,
wherein the conveying mechanism comprises conveyance roller pairs disposed in the conveyance path, and
wherein the hardware processor specifies a pair at which the sheet is present at completion of the draw-in operation from among the conveyance roller pairs, and separates the specified roller pair.

14. The image forming apparatus according to claim 13, wherein the hardware processor does not separate the conveyance roller pairs during the draw-in operation and separates the conveyance roller pairs after the draw-in operation.

15. The image forming apparatus according to claim 13, wherein the hardware processor conveys the second sheet to the conveyance roller pairs after separating a conveyance roller pair which nips the first sheet.

* * * * *